(12) United States Patent
Goodman et al.

(10) Patent No.: US 12,190,151 B2
(45) Date of Patent: Jan. 7, 2025

(54) MULTI-STAGE THREAD SCHEDULING

(71) Applicant: Apple Inc., Cupertino, CA (US)

(72) Inventors: Benjiman L. Goodman, Cedar Park, TX (US); Anjana Rajendran, Austin, TX (US); Sheenam Jayaswal, Austin, TX (US); Terence M. Potter, Austin, TX (US); Yoong Chert Foo, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/054,376

(22) Filed: Nov. 10, 2022

(65) Prior Publication Data

US 2024/0095065 A1 Mar. 21, 2024

Related U.S. Application Data

(60) Provisional application No. 63/376,166, filed on Sep. 19, 2022.

(51) Int. Cl.
    *G06F 9/48* (2006.01)
(52) U.S. Cl.
    CPC ............ *G06F 9/4881* (2013.01); *G06F 9/485* (2013.01)
(58) Field of Classification Search
    CPC ............................... G06F 9/4881; G06F 9/485
    See application file for complete search history.

(56) References Cited

U.S. PATENT DOCUMENTS

| | | |
|---|---|---|
| 5,974,438 A | 10/1999 | Neufeld |
| 6,105,051 A | 8/2000 | Borkenhagen et al. |
| 6,145,054 A | 11/2000 | Mehrotra et al. |
| 7,237,093 B1 | 6/2007 | Musoll et al. |
| 7,418,576 B1 | 8/2008 | Lindholm et al. |

(Continued)

FOREIGN PATENT DOCUMENTS

| | | |
|---|---|---|
| WO | 2008061154 A3 | 9/2008 |
| WO | 2013098643 A2 | 7/2013 |

OTHER PUBLICATIONS

International Search Report and Written Opinion in PCT Appl. No. PCT/US2023/028163 mailed Nov. 6, 2023, 10 pages.

(Continued)

*Primary Examiner* — Michael J Metzger
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to multi-stage thread scheduling. In some embodiments, processor circuitry includes multiple channel pipelines for multiple channels and multiple execution pipelines shared by the channel pipelines and configured to perform different types of operations provided by the channel pipelines. First scheduler circuitry may arbitrate among threads to assign threads to channels. Second scheduler circuitry may arbitrate among channels to assign an operation from a given channel to a given execution pipeline. The execution pipelines may provide backpressure information to the first scheduler circuitry based on execution status and the first scheduler circuitry may adjust priority of a thread for assignment to a channel based on the backpressure information. Disclosed techniques may reduce channel conflicts and starvation for execution resources.

20 Claims, 20 Drawing Sheets

(56) References Cited

U.S. PATENT DOCUMENTS

| | | |
|---|---|---|
| 7,478,388 B1 | 1/2009 | Chen et al. |
| 7,895,415 B2 | 2/2011 | Gonzalez |
| 8,095,778 B1 | 1/2012 | Golla |
| 8,533,719 B2 | 9/2013 | Fedorova |
| 10,027,587 B1 | 7/2018 | O'Brien et al. |
| 10,089,114 B2 | 10/2018 | Kulkarni et al. |
| 10,585,670 B2 | 3/2020 | Abdallah |
| 10,642,618 B1 | 5/2020 | Hakewill |
| 11,301,298 B2 | 4/2022 | Varma |
| 11,314,562 B2 | 4/2022 | Dice |
| 2004/0059896 A1 | 3/2004 | Kossman et al. |
| 2004/0060052 A1 | 3/2004 | Brown et al. |
| 2005/0114856 A1 | 5/2005 | Eickemeyer et al. |
| 2005/0210158 A1 | 9/2005 | Cowperthwaite et al. |
| 2006/0179280 A1 | 8/2006 | Jensen et al. |
| 2007/0103476 A1 | 5/2007 | Huang et al. |
| 2007/0143582 A1 | 6/2007 | Coon et al. |
| 2009/0210677 A1 | 8/2009 | Luick |
| 2010/0083267 A1 | 4/2010 | Adachi et al. |
| 2011/0276784 A1 | 11/2011 | Gewirtz et al. |
| 2012/0079503 A1 | 3/2012 | Dally et al. |
| 2013/0166881 A1 | 6/2013 | Choquette et al. |
| 2014/0160126 A1 | 6/2014 | Legakis et al. |
| 2014/0282566 A1 | 9/2014 | Lindholm |
| 2015/0046684 A1 | 2/2015 | Mehrara et al. |
| 2016/0246728 A1 | 8/2016 | Ron et al. |
| 2016/0292814 A1* | 10/2016 | Holland ................. G09G 5/393 |
| 2018/0046577 A1 | 2/2018 | Chen et al. |
| 2018/0181491 A1 | 6/2018 | DeLaurier et al. |
| 2019/0018676 A1* | 1/2019 | Alexander ............ G06F 9/3822 |
| 2019/0340019 A1 | 11/2019 | Brewer |
| 2019/0370059 A1 | 12/2019 | Puthoor et al. |
| 2020/0043123 A1 | 2/2020 | Dash |
| 2020/0293450 A1 | 9/2020 | Vemulapalli et al. |
| 2021/0073450 A1 | 3/2021 | Boesch |
| 2021/0342158 A1 | 11/2021 | Brewer |
| 2021/0382717 A1 | 12/2021 | Jiang |
| 2022/0043413 A1 | 2/2022 | Heydari |
| 2022/0091657 A1 | 3/2022 | Tsien |
| 2022/0100484 A1 | 3/2022 | Abu-Ghazaleh et al. |
| 2022/0206876 A1 | 6/2022 | Beckmann et al. |
| 2023/0367676 A1 | 11/2023 | Jeyapaul et al. |
| 2023/0401132 A1 | 12/2023 | Patle et al. |

OTHER PUBLICATIONS

Office Action in U.S. Appl. No. 18/054,388 mailed Feb. 23, 2024, 14 pages.

* cited by examiner

MULTI-STAGE THREAD SCHEDULING

CROSS-REFERENCE TO RELATED APPLICATIONS

The present application claims priority to U.S. Provisional App. No. 63/376,166, entitled "Multi-stage Thread Scheduling," filed Sep. 19, 2022, the disclosure of which is incorporated by reference herein in its entirety.

This application is related to the following U.S. Applications: U.S. application Ser. No. 18/054,380, U.S. application Ser. No. 18/054,388, and U.S. application Ser. No. 18/054,401.

Each of the above-referenced applications is hereby incorporated by reference as if entirely set forth herein.

BACKGROUND

Technical Field

This disclosure relates generally to computer processors and more particularly to thread scheduling.

Description of the Related Art

Computer processors typically execute substantial numbers of threads, sometimes in parallel. For example, graphics processors typically operate on thread groups with hundreds or thousands of threads, which may be grouped into single-instruction multiple-data (SIMD) groups for parallel processing. Graphics processors may implement large numbers of shader pipelines, with various execution circuitry to perform operations (e.g., integer operations, floating-point operations, load/store operations, sample operations, etc.). Mapping threads/SIMD groups to execution resources in an efficient manner may improve performance, reduce power consumption, reduce chip area at a given performance level, etc.

DETAILED DESCRIPTION

Figure 1A:
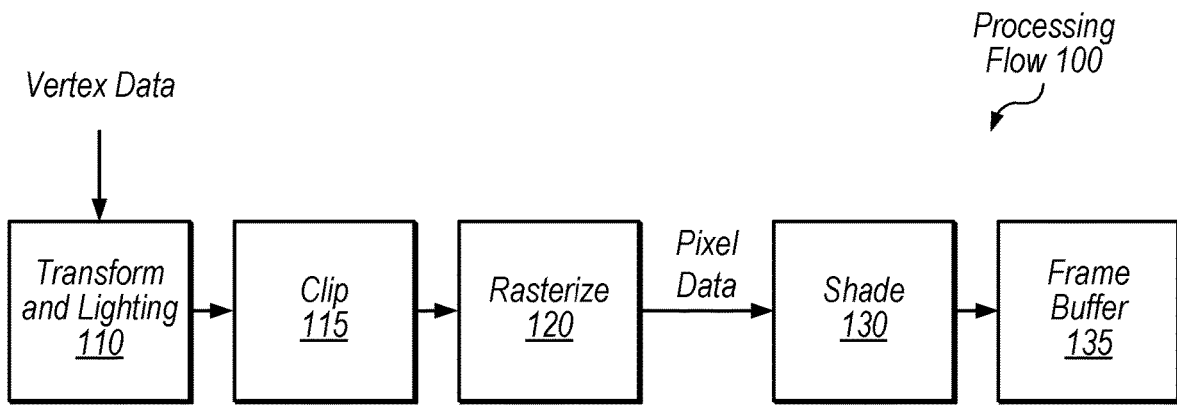
FIG. 1A is a diagram illustrating an overview of example graphics processing operations, according to some embodiments.

As discussed above, mapping threads/SIMD groups to execution resources in an efficient manner may improve performance, reduce power consumption, reduce chip area at a given performance level, or some combination thereof. In various disclosed embodiments, datapath units are shared by multiple SIMD groups. For example, scheduling circuitry may arbitrate among multiple SIMD groups to utilize a particular floating-point unit. Shared datapath blocks may provide efficiency in terms of circuit area and power consumption, but scheduling and arbitration may be particularly important. For example, saturating datapath units may cause work to stall while leaving data path units idle may also reduce performance. Further, as discussed in detail below, certain operations may have varied latencies depending on execution conditions. For example, instructions that miss in an instruction cache or a data cache may have substantially longer latency than instructions that hit in both.

In disclosed embodiments, a two-stage scheduling technique first arbitrates among threads to assign threads to channels and then arbitrates among channels to assign instructions from channels to execution pipelines (e.g., ALUs). Therefore, the overall pipeline may include multiple channel pipelines (which may include stages such as decode, hazard control, fence check, instruction cache check, etc.) from which control circuitry maps instructions to multiple execution pipelines (e.g., floating-point pipelines, integer pipelines, load pipelines, store pipelines, etc.). This sharing of execution resources may satisfy performance targets while reducing chip area (relative to using dedicated execution circuitry for each thread).

In some embodiments, the first-stage schedule circuitry may utilize compiler hints and back-pressure information from the execution pipelines to adjust its priority values. The compiler hints may indicate which execution pipelines are targeted by a given thread. Disclosed techniques may advantageously suppress threads that target busy execution pipelines or prioritize threads that target unused execution pipelines.

In some embodiments, control circuitry may determine whether to stall a thread in a channel or to deactivate the thread from the channel (e.g., send it back to the first-stage scheduler) based on instruction state information from the execution pipelines. For example, control circuitry may determine to stall a thread with an instruction that hits in a cache or deactivate a thread with an instruction that misses in the cache. This may advantageously reduce blocking by threads with long-running instructions.

In some embodiments, architectural registers such as general-purpose registers (GPRs), special registers, stack registers, etc. are memory backed. In these embodiments, control circuitry may flush and invalidate cache lines used for architectural registers when a context switch occurs and save a pointer to the memory pages targeted by the flush. This may allow the register data to be properly retrieved on a context resume. More generally, the control circuitry may move data from memory structures that are tagged by a private memory identifier to a level of a memory hierarchy that is tagged by a system memory address.

In some embodiments, control circuitry may determine whether to deactivate threads from channels based on instruction cache misses. The control circuitry may implement multiple types of instruction cache requests, including a type of request that does not allow deactivation of the corresponding thread, in order to provide forward progress. This may advantageously reduce blocking by threads that miss in one or more instruction caches while still providing forward progress.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
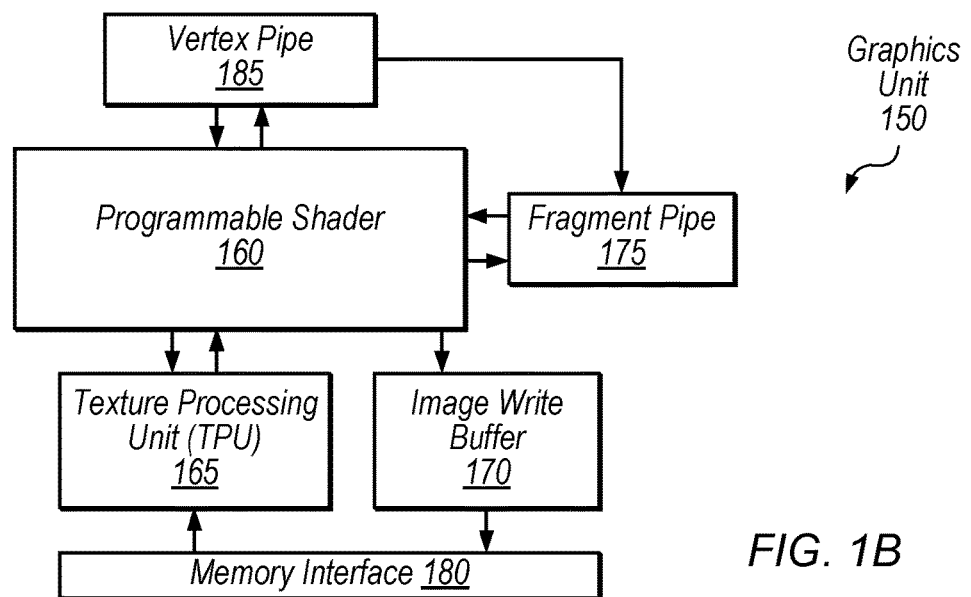
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Pipeline with Two-Stage Scheduling

It is generally desirable to avoid oversaturating or starving datapath units. In embodiments discussed in detail below, a two-stage scheduling approach first assigns threads to channels and then assigns a channel to issue an instruction to a given execution unit in a given cycle. The scheduling may take backpressure information into account to incorporate the status of various execution units in the first-stage scheduling.

Figure 2:
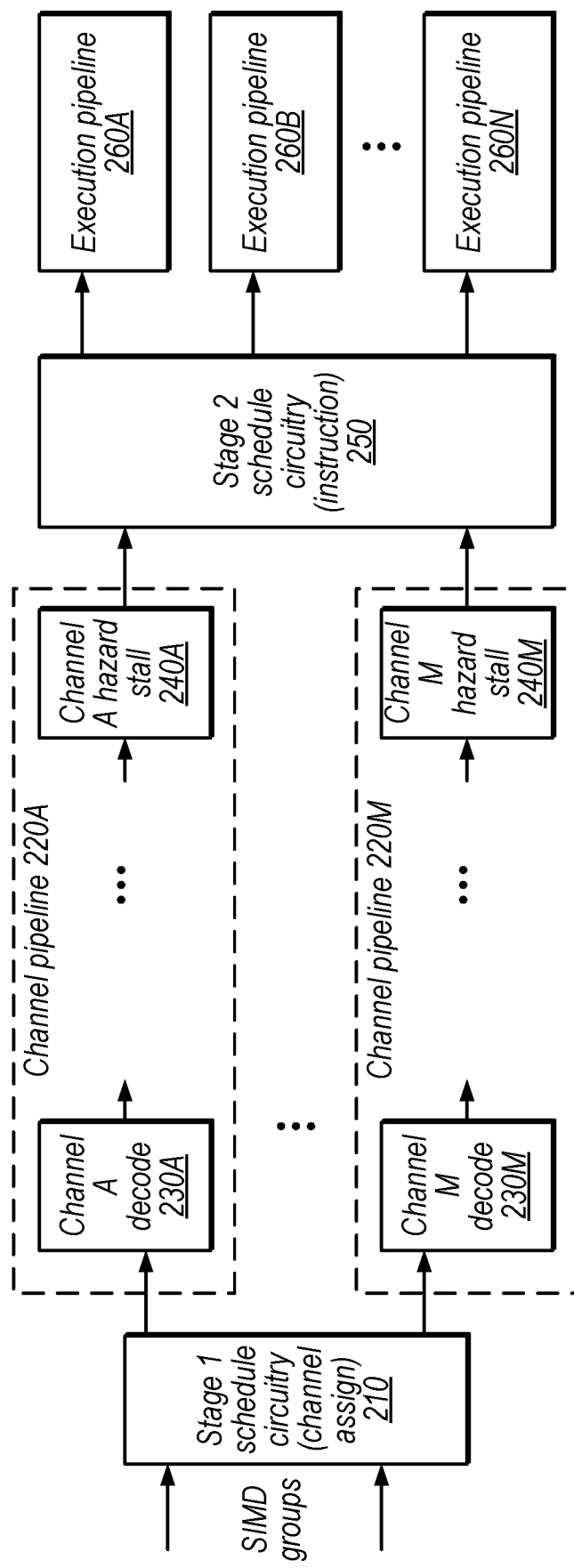
FIG. 2 is a block diagram illustrating example pipeline circuitry with two-stage scheduling, according to some embodiments.

FIG. 2 is a block diagram illustrating example pipeline circuitry with two-stage scheduling, according to some embodiments. In the illustrated example, a pipeline includes stage 1 schedule circuitry 210, channel pipelines 220A-220M, stage 2 schedule circuitry 250, and execution pipelines 260A-260N.

Stage 1 schedule circuitry 210 may assign incoming SIMD groups to channels, as shown. Circuitry 210 may also be referred to as a first-stage scheduler or SIMD group scheduler. Note that other embodiments may not implement SIMD techniques and a single thread may be assigned to a given channel. In other embodiments, any appropriate set of one or more threads may be assigned to a given channel.

Stage 1 schedule circuitry 210 may implement an age-based scheduler in which older threads are generally prioritized for assignment to channels. As discussed in detail below, however, this age-based scheme (or any other appropriate default scheme) may be modified in certain scenarios.

Each channel pipeline 220, in the illustrated embodiment, includes a decode stage 230 and a hazard stall stage 240. Decode stage 230 may identify the nature of an instruction, which may specify which execution pipeline 260 (or a set of potential execution pipelines 260) that should perform the instruction. While partial decode may occur before stage 230, the target pipeline(s) for an instruction may not be known until after stage 230. Therefore, specific instructions included in a thread may not be considered when assigning threads to channels (other than based on compiler hints, as discussed below with reference to FIG. 3).

Hazard stall stage 240, in the illustrated embodiment, may stall an instruction until any hazards are resolved. Thus, stalled instructions may not be eligible for arbitration at the stage 2 schedule circuitry 250.

Stage 2 schedule circuitry 250, in the illustrated embodiment, is configured to arbitrate among ready instructions from channel pipelines 220 for assignment to execution pipelines 260. Stage 2 schedule circuitry 250 may select multiple instructions for assignment to different execution pipelines in a given cycle.

Execution pipelines 260 are configured to perform the operation specified by a given instruction and may include various different units, e.g., integer units, sample units, floating-point units, load/store units, etc. Some execution pipelines 260 may be different instantiations of the same type of unit, e.g., multiple integer units. In other embodiments, execution pipelines include at most one of a given type of unit. Generally, at certain times, there may be a greater number of instructions in channel pipelines 220 that target a certain type of execution pipeline 260 than the number of available execution pipelines 260 of that type. Stage 2 schedule circuitry 250 may arbitrate among the channel pipelines 220 in this scenario.

Figure 3:
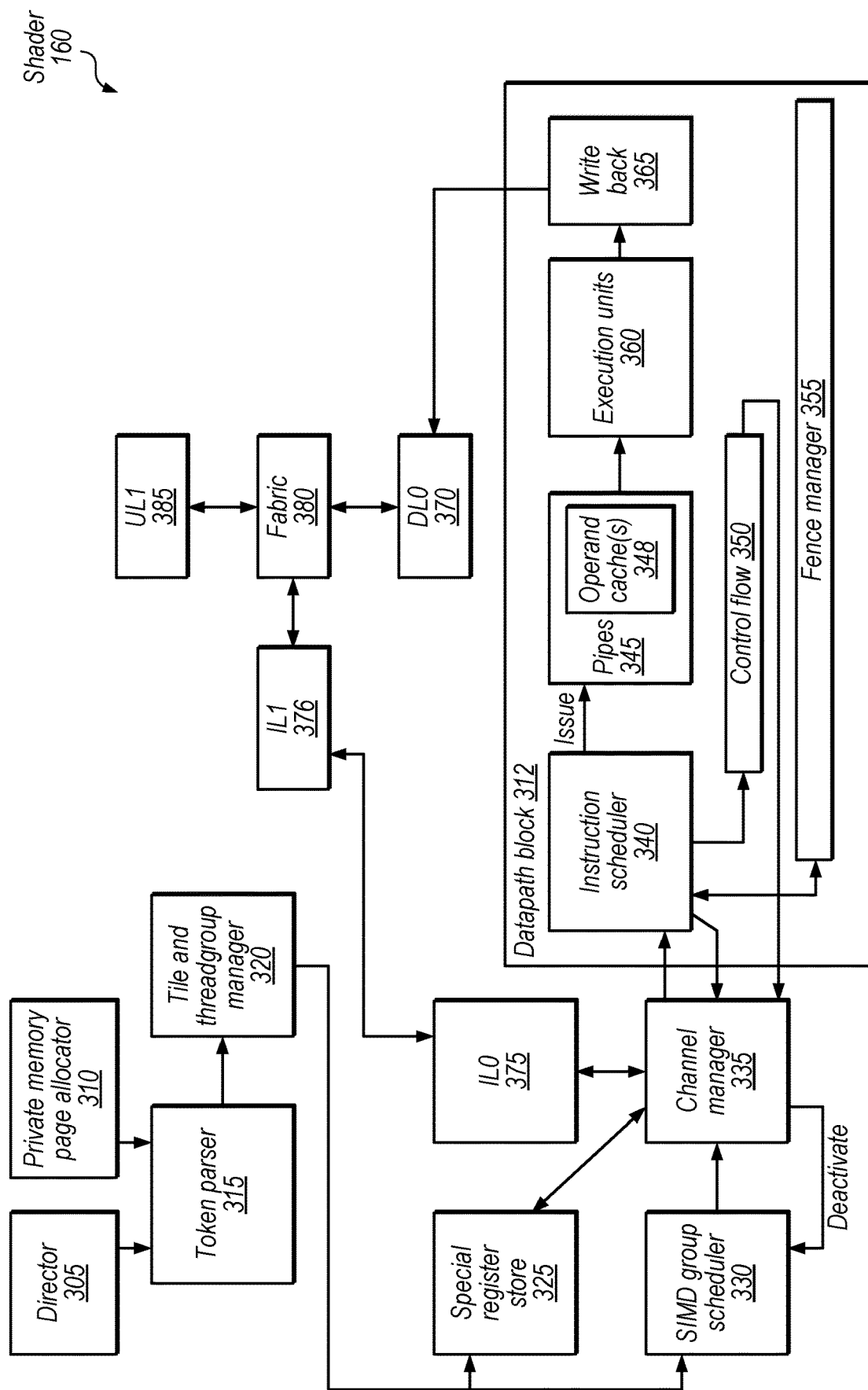
FIG. 3 is a block diagram illustrating an example shader that may include the pipeline of FIG. 2, according to some embodiments.

FIG. 3 is a block diagram illustrating an example shader that may include the pipeline of FIG. 2, according to some embodiments. In the illustrated embodiment, shader 160 includes director 305, private memory page allocator 310, token parser 315, tile and threadgroup manager 320, special register store 325, SIMD group scheduler 330, channel manager 335, datapath block 312, data level 0 (DL0) cache 370, instruction level 0 cache (IL0) 375, instruction level 1 (IL1) cache 376, fabric 380, and unified level 1 (UL1) cache 385.

Director circuitry 305 may provide work from multiple data masters (e.g., a compute data master, vertex data master, and pixel data master) to token parser 315. Private memory page allocator 310 may allocate pages for private memory spaces, as requested by token parser 315. Note that elements 305 and 310 may be external to shader 160 and may communicate with multiple shaders 160.

Token parser 315, in some embodiments, is configured to receive work tokens from multiple data masters, form SIMD groups, and interact with allocator 310 to allocate pages for private memory.

Tile and threadgroup manager 320, in some embodiments, is configured to coordinate execution of SIMD groups within a tile (e.g., for pixel work) or threadgroup (e.g., for compute work). This may include enforcing various types of synchronization, for example.

SIMD group scheduler 330, in some embodiments, is configured to manage SIMD-group-scoped state information and identify highest-priority cliques that are ready to execute, according to an arbitration scheme. The arbitration scheme may be primarily age-based but may also consider other factors. SIMD group scheduler may correspond to stage 1 schedule circuitry 210.

Channel manager circuitry 335, in some embodiments, is configured to fetch instructions and dispatch them to instruction scheduler 340. It may manage channel activation and deactivation, manage the program counter for a given SIMD group, manage architectural state (e.g., accessing special register store 325, which may implement SIMD-group-scoped architectural special registers such as the program counter), fetch instructions, and dispatch instructions. Channel manager 335 may read the special register store 325 when activating a SIMD group into a channel and write special register store 325 when deactivating a SIMD group from a channel.

Datapath block 312, in some embodiments, is configured to execute dispatched instructions and may include channel pipelines and shared execution pipelines. Datapath block 312 may be instantiated multiple times in a given GPU. In the illustrated embodiment, datapath block 2312 includes instruction scheduler 340, pipeline circuitry 345 (which may correspond to channel pipelines 220), operand caches 348, execution units 360 (which may correspond to execution pipelines 260), write back circuitry 365, control flow circuitry 350, and fence manager 355.

Instruction scheduler 340, in some embodiments, is configured to manage execution resources inside datapath block 312 and schedule individual instruction execution. This may include fine decode of incoming instructions, sequencing microoperations, data dependency and hazard detection, managing a read operand cache and write buffer circuitry, priority-based instruction scheduling, generating read and write requests to DL0 375, generating pipeline control signals, and enforcing SIMD group deactivations.

Pipelines 345 may include one or more math pipelines (which may execute floating-point, integer, and iterate instructions, for example), one or more address generator pipelines (e.g., for load, store, atomic, sample, and image write instructions), and one or more control flow units (shown separately as control flow circuitry 350) configured to execute conditional and branch instructions. Execution units 360 may perform various types of operations for the pipelines 345. As shown, operand cache(s) 348 may be the lowest level of operand storage. Write-back stage 365 may write results to DL0. Note that write operations may be posted.

Fence manager circuitry 355, in some embodiments, is configured to ensure that data dependencies outside of datapath block 312 are maintained. As discussed in detail below, fence manager 355 may implement fence counters per SIMD group per fence (e.g., where a non-zero fence count indicates an outstanding dependency). Fence manager 355 may also implement an ordered instruction queue per channel (referred to as a channel queue) to tracked pipelined fences for committed instructions. In some embodiments, fence manager 355 may trigger deactivation of a channel in certain situations.

DL0 cache 370, in some embodiments, is configured to cache all or a portion of registers included in thread private memory. In some embodiments, a given DL0 cache 370 is associated with one datapath block 312. Instruction scheduler 340 may initiate tag lookups in DL0 cache 370.

IL0 cache 375, in some embodiments, is the lowest-level instruction cache and is configured to provide instructions to one or more stages of channel manager 335. IL1 cache 376, in some embodiments, is configured to respond to fill requests from IL0 cache 375 and may retrieve instruction data from UL1 cache 385 via fabric 380 for misses. Example embodiments of IL0 cache 375 and IL1 cache 376 are discussed in detail below with reference to FIG. 12.

Fabric circuitry 380, in some embodiments, is a packet-switched network that provides communication between a number of shader modules. As some examples of communications via fabric circuitry 380, caches may access thread-private memory, the token parser 315 may initialize SIMD group and threadgroup state stored in UL1 prior to launching a SIMD group, sampling and image write pipes may read interface-private memory, texture processing results may be forwarded to stack registers, vertex circuitry may send fetch requests for vertex data, IL1 cache 376 may request IL1 miss data from global memory, global memory may receive evictions and line fill requests, etc.

UL1 cache 385, in some embodiments, is a unified instruction and data cache configured to store data evicted from IL1 cache 376 and DL0 cache 370. In other embodiments, IL1 cache 376 is a read-only cache that may retrieve data from UL1 cache 385 but does not evict data to ILL Example Hint-Based Scheduling It may be challenging to determine what datapath units are targeted by a given thread at the first scheduling stage, e.g., because decode occurs afterwards. Therefore, in some embodiments, a compiler provides hints regarding a set of execution resources targeted by a given thread. These hints may be encoded in various ways. As one example, a bit per execution unit may be set or cleared based on whether that execution unit is targeted. The bit may be set based on a threshold number of instructions targeting the unit. In other embodiments, multiple bits per target may be utilized to provide more information regarding the number of times a given execution unit is targeted.

Figure 4:
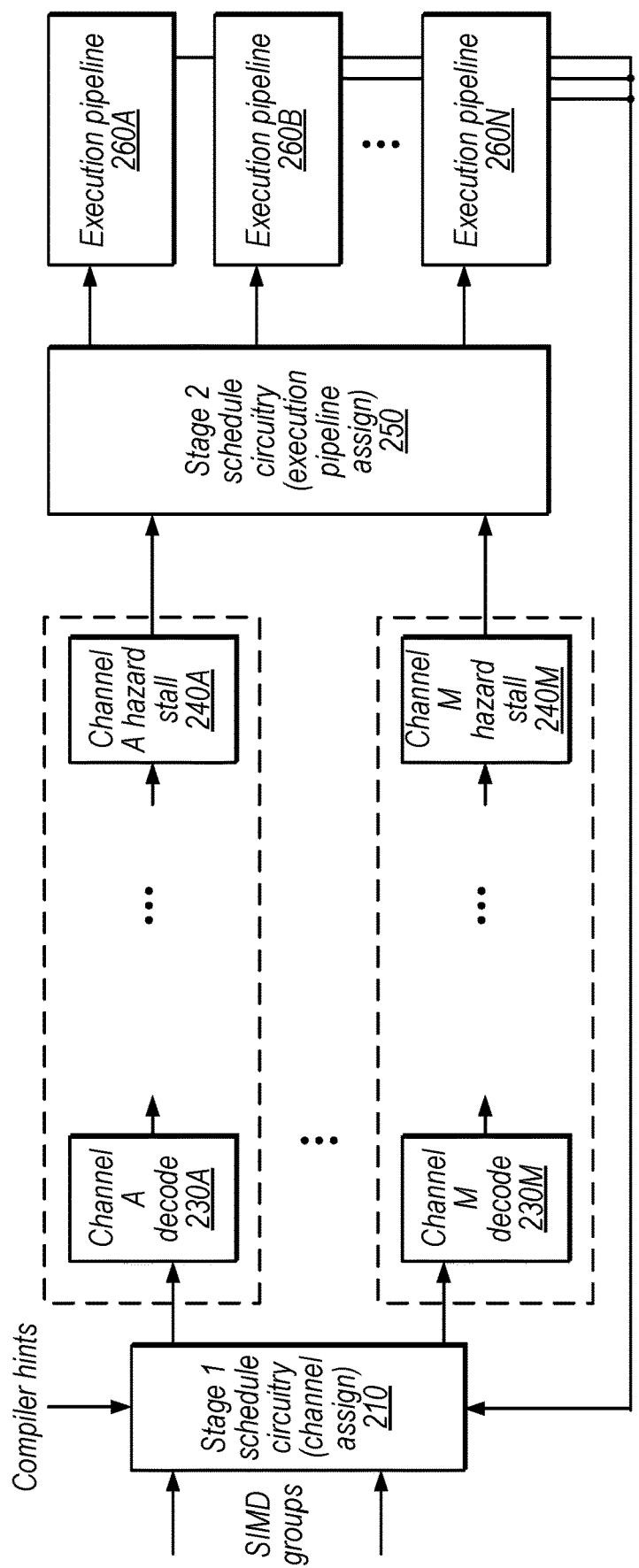
FIG. 4 is a block diagram illustrating an example pipeline with hint-based scheduling, according to some embodiments.

FIG. 4 is a block diagram illustrating an example pipeline with hint-based scheduling, according to some embodiments. The illustrated example is similar to FIG. 2, but with compiler hints and back-pressure information provided to stage 1 schedule circuitry 210.

In some embodiments, stage 1 schedule circuitry may use the compiler hints and backpressure information to adjust arbitration. The compiler hints may indicate, for a given thread or SIMD group, the execution pipelines targeted by that SIMD group (the compiler may be able to determine this information when compiling a program, even though the run-time instruction decode may not occur until a channel decode stage 230).

As shown, execution pipelines 260 may provide back-pressure information to stage 1 schedule circuitry. In other embodiments, stage 2 schedule circuitry may provide the back-pressure information. This information may indicate the status of buffers for instructions assigned to a given execution pipeline, for example. The back-pressure information may be encoded in various appropriate formats, such as number of stall cycles, number of instructions buffered, information averaged over a window, etc.

Stage 1 schedule circuitry 210, in some embodiments, is configured to adjust priority of incoming SIMD groups for channel assignment. For example, stage 1 schedule circuitry 210 may prioritize SIMD groups that target an execution pipeline that is currently being starved (e.g., by artificially adjusting an age value for those SIMD groups, using a separate flag for those SIMD groups, adjusting a weight for those SIMD groups in an arbitration computation, etc.). Similarly, stage 1 schedule circuitry 210 may de-prioritize SIMD groups that target an execution pipeline that is currently busy.

Example Convertible Fence Techniques

Fences are commonly used to enforce ordering constraints, e.g., in weakly-ordered memory models. As used herein a "fence" refers to an instruction or operation that causes a processor to enforce an ordering constraint on operations before and after the fence. Fences may also be referred to as "barriers." Generally, processors may allow out-of-order or weakly ordered execution, with additional ordering constraints implemented using fences. A given processor may provide multiple fences for different ordering constraints.

The time that instructions wait on a fence may vary substantially, e.g., based on the status of older instructions. For example, if an older instruction is waiting for a cache fill, the wait may be substantially longer than if the older instruction hits in a data cache. Therefore, in some embodiments, scheduling circuitry determines whether to deactivate a thread from a channel based on execution status of one or more older instructions that have already been assigned to datapath unit(s).

Figure 5:
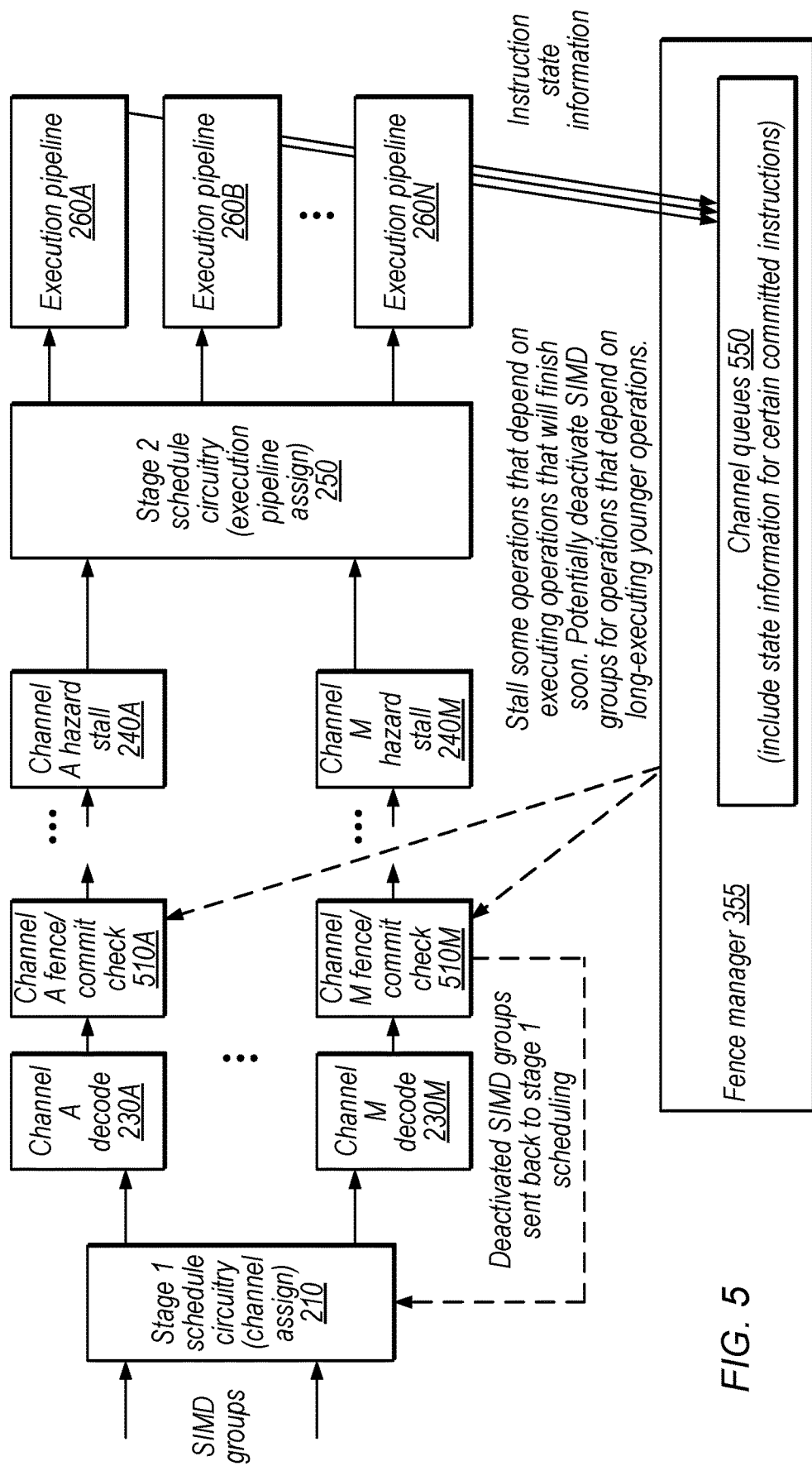
FIG. 5 is a block diagram illustrating an example pipeline configured to process convertible fences, according to some embodiments.

FIG. 5 is a block diagram illustrating an example pipeline configured to process convertible fences, according to some embodiments. Control circuitry may convert this type of fence from initially stalling an instruction to enforce ordering to deactivating a thread that includes the instruction from its channel.

In the illustrated embodiment, the pipeline includes elements described above with reference to FIG. 2 as well as the following additional elements: a commit check stage 510 per channel and fence manager 355. A given operation (e.g., a load operation) may set a fence, which may clear when the load data is returned.

Fence manager 355, in the illustrated embodiment, includes channel queues 550 that are configured to store state information for certain committed instructions in the execution pipelines 260. Fence manager may report this information to fence/commit check stages 510. Channel manager 335, in some embodiments, is configured to determine whether to continue stalling based on a fence at stage 510 or deactivate a SIMD group from a channel. Once an instruction proceeds past commit check stage 510, in some embodiments, it cannot be deactivated but will proceed to stage 2 schedule circuitry 250 for assignment to an execution pipeline.

For example, if a younger operation on which the fence is waiting misses in a data cache (e.g., misses in UL1 cache 385), channel manager 335 may deactivate the SIMD group and send it back to stage 1 scheduling. The SIMD group may then eventually be activated back into a channel and the younger instruction may have completed such that execution can proceed past the fence. If the younger instruction has hit in the data cache, however, even though it may not be complete, channel manager 335 may continue to stall the SIMD group because it understands that the younger instruction will soon complete. Specifically, dependency circuitry may stall a given operation in response to all input operands for younger operations on which it depends being available in a register or in one or more low-level data caches but may deactivate a thread if one or more of its inputs misses in the one or more low-level data caches.

The channel queues 550 may store information for a subset of types of instructions, e.g., those that are potentially long-running. The channel manager 335 may consider the status of multiple younger instructions when determining whether to deactivate or stall a SIMD group. The status information may indicate the current pipeline stage of a given operation, an indication of the type of operation, whether an operation requires a response from a cache (e.g., the UL1 cache 385) before proceeding, whether an operation accesses certain data structures (e.g., a color buffer), whether the operation is setting a fence, an identifier of the set fence, and whether a dependency exists on an older channel queue entry.

When an instruction is pushed to the tail of the channel queue (which may be a FIFO), control circuitry may compare the wait fences associated with the instruction with all of the valid set fences set by older instructions in the channel queue. Matches may be recorded in the dependency field indexed by the entry that set the fence. As operations are popped from a channel queue 550, younger instructions may shift toward the head and the dependency field may drop a bit with each position (e.g., the head entry may have zero dependency bits because it cannot be dependent on any other instructions).

Figure 6:
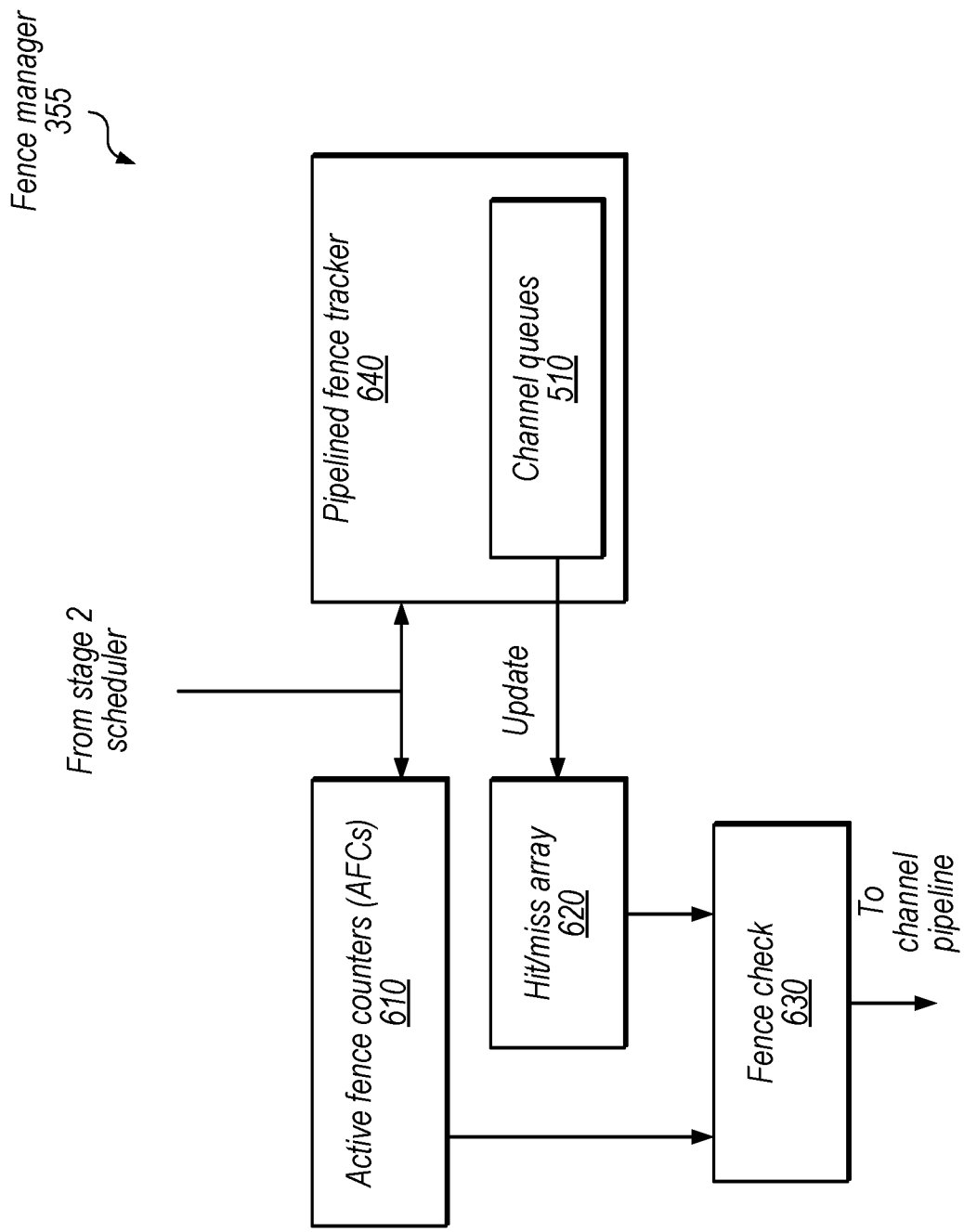
FIG. 6 is a block diagram illustrating an example fence manager, according to some embodiments.

FIG. 6 is a block diagram illustrating an example fence manager, according to some embodiments. In the illustrated example, fence manager 355 includes active fence counters (AFCs) 610, hit/miss array 620, fence check 630, and pipelined fence tracker 640.

In some embodiments, stalls are categorized as short-latency, medium-latency, and long latency. For short-latency stalls, stage 2 schedule circuitry 250 may attempt to issue instructions from other channels to fills gaps, with hazards protected by scoreboard circuitry. Short-latency stalls may be due to ALU latency, for example. For medium-latency stalls, pipelined fence tracker 640 may protect hazards and stage 2 schedule circuitry 250 may attempt to issue instructions from other channels to fills gaps. Medium-latency stalls may be due to short accesses outside of datapath block 312 such as write ordering for UL1. For long-latency stalls, stage 2 schedule circuitry 250 may deactivate the channel. Long-latency stalls may include UL1 accesses due to DL0 misses or sample operations, for example. For even longer stalls, work may be context switched out. Convertible fences may wait to determine whether a stall is long or medium latency (e.g., whether a read on which the stall depends hits in DL0 or requires an access to UL1).

Active fence counters 610, in some embodiments, are incremented for each long-latency transaction and decremented on completion of long-latency transactions. Active fencer counters 610 may include a counter per fence per SIMD group. Note that the types of transactions classified as long-latency transactions may vary in different embodiments. As one example, DL0 370 misses and sample operations may be classified as long-latency transactions. Scheduling circuitry may not be able to cover latency for these transactions by issuing instructions from other channels. In the illustrated embodiment, the counters are incremented and decremented based on information from the stage 2 scheduler.

Pipelined fence tracker 640, in the illustrated embodiment, is configured to control the active fence counters and stall channels when waiting for a fence. Hit/miss array 620, in some embodiments, is configured to track whether a given fence counter represents a number of decrements expected due to cache hits (in which case a channel may be stalled) or not (e.g., cache misses or non-pipelined set fences, in which case a channel may be deactivated). Therefore, hit/miss array may include a bit per active fence counter, for example.

Fence check circuitry 630, in the illustrated embodiment, is configured to check whether there are collisions between waiting for fences and setting fences. Fence check 630, in some embodiments, is configured to check un-committed instructions as well as committed instructions. Fence check circuitry 630 may, in response to determining that a wait fence check matches an active convertible fence from an older instruction, fail the fence check and deactivate the SIMD group.

Fence manager 355 may maintain a faling_fence_mask and a conv_fence_mask that tracks all outstanding convertible set fences for all instructions of the same SIMD group that are waiting for data that hit in UL1 or have yet to send their requests to UL1. Younger instructions may send tag checks and prefetch data while older instructions stall in pipeline stage 510 (which may be the last place an instruction can be marked for deactivation). These instructions may stall until a miss is returned (which may deactivate the channel) or all requests hit (in which case they may continue to stall until their data is available in DL0 370 and then proceed to later pipeline stages, which may access the data in DL0).

The circuitry of FIG. 6 represents one example implementation of fencing operations, but disclosed stall/deactivate techniques based on instruction state information may be utilized with various memory ordering architectures.

Figure 7A:
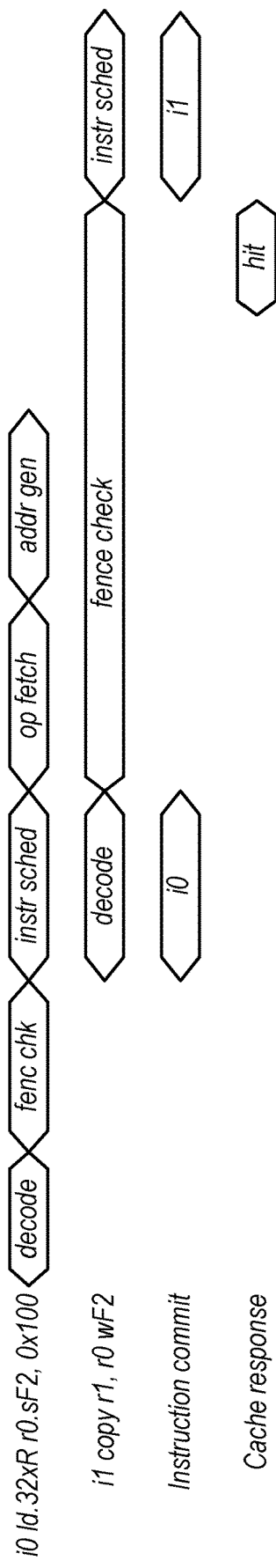
FIGS. 7A and 7B are diagrams illustrating example instruction sequences with channel stalling and channel deactivation, according to some embodiments.
Figure 7B:
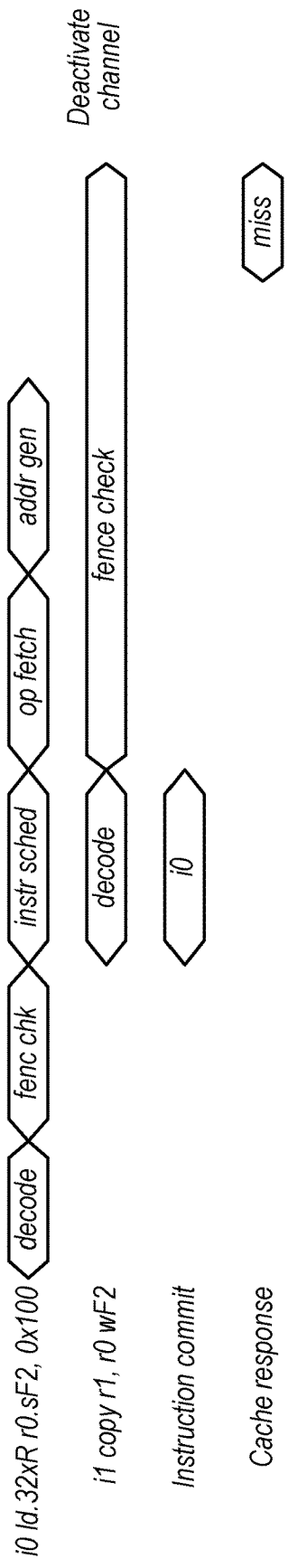

FIG. 7A is a diagram illustrating an example instruction sequence where a channel is stalled while FIG. 7B is a diagram illustrating an example instruction sequence where a channel is deactivated, according to some embodiments.

In the illustrated examples, execution status over time is shown for the following instruction sequence:

Instruction i0: 1d.32xR r0.sF2, 0x100
Instruction i1: copy r1, r0 wF2 where the first instruction i0 is a load that targets register r0 and the second instruction is a copy of the contents of r0 into r1. The ".sF2" operator sets fence 2 and the "wF2" operator waits on this fence.

In both examples of FIGS. 7A and 7B, instruction i0 proceeds through decode, fence check, instruction schedule (e.g., stage 1 scheduler), operand fetch, and address generation stages. Instruction i1 proceeds through the decode stage and then stalls at the fence check stage while waiting for fence 2 to clear.

In the example of FIG. 7A, there is a cache hit for instruction i0, and instruction i1 commits in the next cycle. In the example of FIG. 7B, there is a cache miss for instruction i0 and channel manager 335 deactivates the channel. This may allow the channel to be used by another SIMD group rather than being blocked by it while it waits for a data fetch into the cache.

Example Preemption Techniques in the Context of Memory-Backed Registers

In some embodiments, various memory spaces (including general-purpose registers) are memory-backed. For example, referring back to FIG. 3, register data may be stored in DL0 370 and operand cache(s) 348 rather than a dedicated register file and may be backed in UL1 385 and one or more other memory hierarchy levels (e.g., eventually at a system memory, which may be shared for non-graphics data, e.g., from I/O units, a CPU, etc.) according to a unified memory architecture.

In various situations, an operating system or driver may determine to context switch out certain work, e.g., to allow higher-priority work to execute. This may involve a context save of completed work and a context restore when the higher-priority work is finished. For a given thread group, all executing SIMD groups included in the thread group may need to have their context saved, and additional context for the thread group may also be saved. In the memory-backed context, properly handling register data when a SIMD group is context switched out may be challenging.

Figure 8:
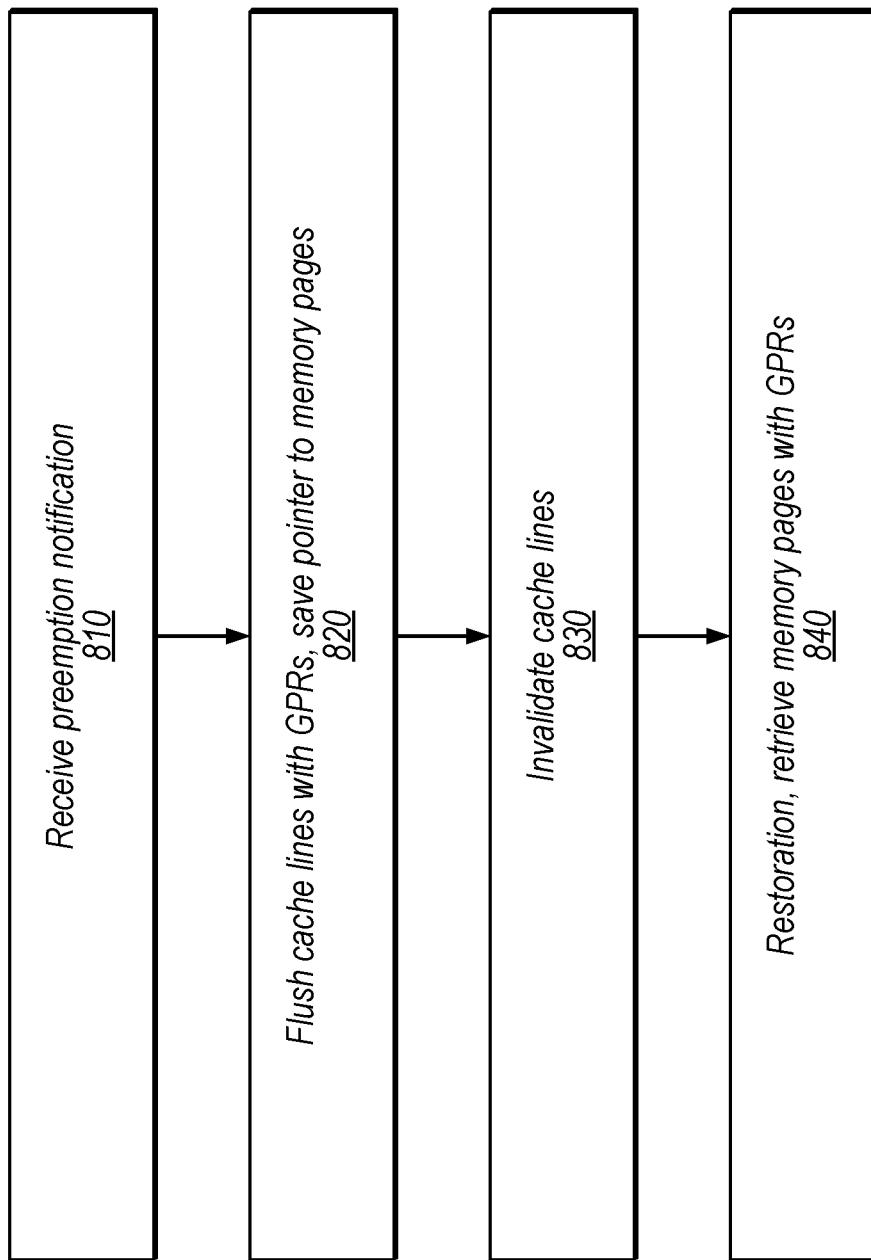
FIG. 8 is a flow diagram illustrating an example method for handling a preemption notification, according to some embodiments.

FIG. 8 is a flow diagram illustrating an example method for handling a preemption notification, according to some embodiments. At 810, in the illustrated embodiment, control circuitry receives a preemption notification, e.g., from tile and threadgroup manager 320. In response, the control circuitry may initiate a context store to save the context of the preempted SIMD group(s). This may include saving their general-purpose register data. Some instructions may be allowed to finish execution and save state while other instructions may be flushed and re-executed later.

At 820, in the illustrated embodiment, the control circuitry flushes cache lines in DL0 370 used to store GPRs (e.g., a flush to UL1 385). The control circuitry also saves a pointer to memory pages associated with cache lines. This may ensure that the control circuitry is able to properly locate those pages for a context resume (e.g., at 840, discussed in detail below).

Note that flushing the cache lines may move data from memory structures that are tagged using a private memory identifier (e.g., GPR data in operand caches) into a higher level of the memory hierarchy that is tagged by system memory addresses. This may advantageously facilitate context saving of this data such that it can later be restored properly without being lost.

Note that while GPRs are discussed herein for purposes of illustration, similar techniques may be used for other architectural registers such as special register, stack registers, etc. Similarly, various private memory spaces may also be memory backed, such as threadgroup private memory, local image block private memory, etc.

At 830, in the illustrated embodiment, the control circuitry invalidates the flush cache lines. Note that the flush and invalidate may be specified as a single operation, in some embodiments.

At 840, in the illustrated embodiment, for a context restore, the control circuitry retrieves the saved memory pages used to track the GPR's so that GPR data is available for continued execution.

Figure 9B:
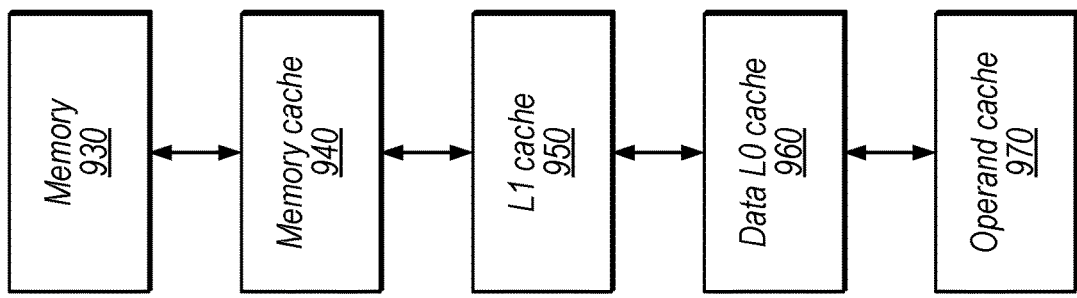
FIGS. 9A and 9B are block diagrams illustrating example circuitry associated with a cache flush/invalidate for a context switch, according to some embodiments.
Figure 9A:
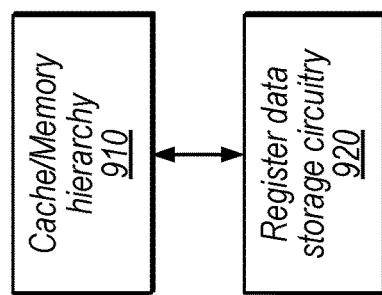

FIG. 9A is a block diagram illustrating example circuitry associated with a cache flush/invalidate for a context switch, according to some embodiments. In the illustrated example, register data storage circuitry 920 (e.g., a register file, DL0 370, or an operand cache 348) is configured to flush and invalidate register data to cache/memory hierarchy 910.

FIG. 9B is a more detailed block diagram illustrating example circuitry associated with a cache flush/invalidate for a context switch, according to some embodiments. In the illustrated example, a device includes memory 930, memory cache 940, L1 cache 950, data L0 cache 960, and operand cache 970. In some embodiments, a device may omit one or more illustrated cache levels, include one or more other cache levels (not shown), or both. In the illustrated example, control circuitry may flush and invalidate GPR data from data L0 cache 960 to L1 cache 950. Page management control circuitry may record the pages in memory 930 that back those cache lines for eventual restoration, as discussed in detail below.

Figure 10:
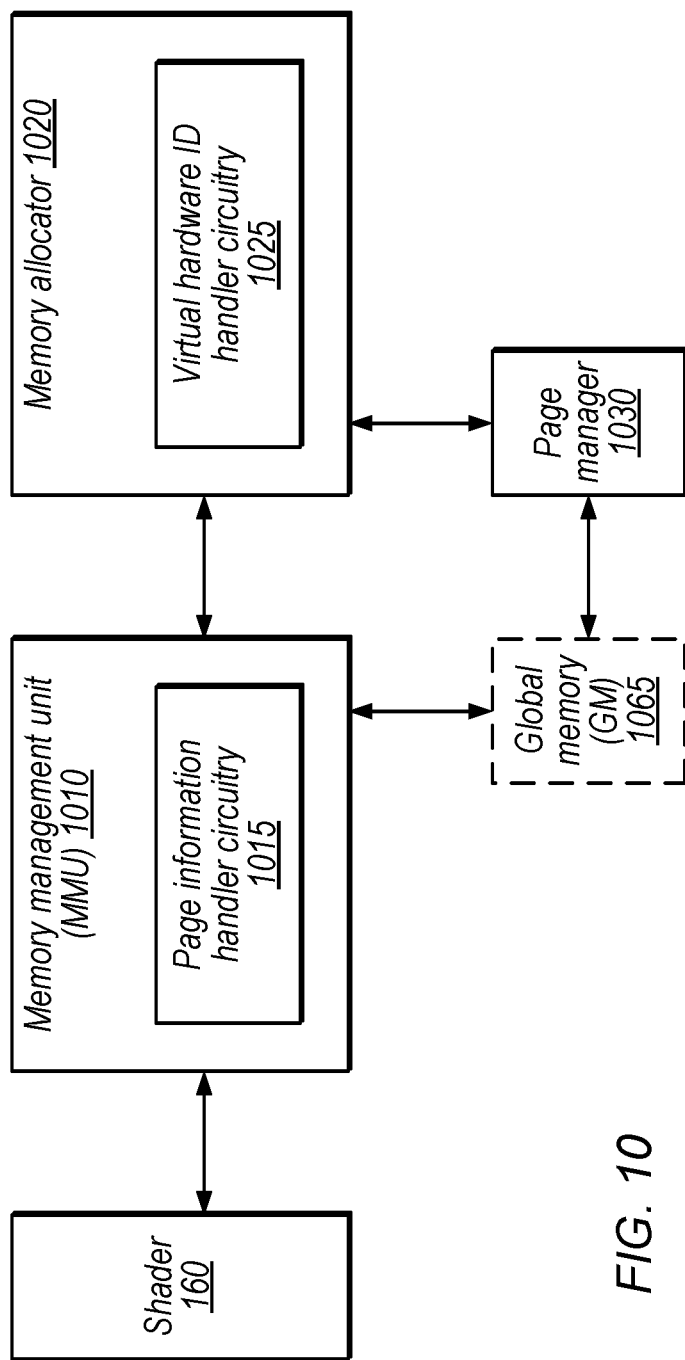
FIG. 10 is a block diagram illustrating example control circuitry configured to handle page information for a context switch, according to some embodiments.

FIG. 10 is a block diagram illustrating example control circuitry configured to handle page information for a context switch, according to some embodiments. In the illustrated embodiment, a processor includes shader 160, memory management unit (MMU) 1010, memory allocator 1020, and page manager 1030, and is configured to access a global memory 1065. As shown, MMU 1010 includes page information handler circuitry 1015 and memory allocator 1020 includes virtual hardware ID handler circuitry 1025. Circuitry 1015 and 1025 may correspond to the control circuitry discussed above.

MMU 1010, in some embodiments, is configured to communicate with global memory (GM) 1065 for accesses by shader circuitry 160. MMU 1010 may handle translations between address spaces (e.g., from private address spaces to virtual addresses, from virtual addresses to physical addresses, etc.). MMU 1010 may receive address mapping requests and page reservation requests, and respond with virtual addresses and page grants. MMU 1010 may communicate with memory allocator 1020 to obtain memory pages to respond to page reservation requests. In some embodiments, MMU 1010 maintains a page table cache.

Memory allocator circuitry 1020, in some embodiments, is configured to communicate with global memory 1065 via page manager circuitry 1030 to obtain pages to satisfy requests from MMU 1010. Memory allocation 1020 may include a page descriptor cache and a page catalog cache. Page manager circuitry 1030 may provide virtual addresses of allocated pages to memory allocator 1020.

Page manager circuitry 1030, in some embodiments, includes primary and distributed components. The primary page manager may interact with software to manage pools of pages while the distributed page managers may work with MMU hierarchies for graphics shader hardware. For example, the primary page manager may map a set of one or more graphics kicks to a given memory pool. Therefore, page manager circuitry 1030 may store page table descriptor information in global memory 1065 and may also cache page table descriptor entries.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that indicates a mapping between the kick's virtual addresses and physical addresses.

Pages may be reserved from a page pool before the corresponding kick(s) are allowed to launch on the shader hardware. When a shader program ends, the pages may be released back to the page pool (e.g., using dedicated page reserve/release interfaces in some embodiments). Pages may also be allocated to MMU's based on demand (and only reserved pages may be allocated, in some embodiments), and freed when the MMU is done with them. Therefore, in some embodiments, the page manager implements separate reserve/release and allocate/free interfaces. For allocation, the system may use a credit-based mechanism to push virtual pages to MMU hierarchies. The page manager may also interact with one or more data controller units (e.g., a vertex data controller, a pixel data controller, and a compute data controller) to coordinate start-of-kick and end-of-kick activities and to support logical kickslots.

Page information handler circuitry 1015, in some embodiments, is configured to save a catalog base address (e.g., per page manager in distributed embodiments with multiple page managers 1030). Backing cache lines for GPRs may be on pages managed by MMU 1010 and therefore restoring the catalog base address may allow for dynamic restoration when a context restore occurs. For example, rather than actually retrieving GPR data, dynamic restoration means that misses will repopulate caches at various levels, such as page-related caches such as page catalog/directory/table caches and data caches such as those shown in FIG. 9B. While the catalog base address is saved in this example, other base address information (or other identifying information for a page table level) may be saved and restored in embodiments with other paging topologies.

In some embodiments, shader private memory addresses may contain embedded hardware identifiers such as SIMD group ID's, tile ID's, execution state ID's, etc. Identifiers may be encoded or hashed into a given address using various appropriate techniques. In some embodiments, a given hardware ID is only allocated for work within a single kickslot at a time.

In some embodiments, virtual hardware ID handler circuitry 1025 is configured to virtualize private addresses to provide a larger number of virtual hardware IDs than supported by the actual hardware. For example, the hardware ID provided as part of a private address may be replaced by a virtual hardware ID within memory allocator 1020. This may allow a greater number of virtual IDs than hardware IDs, allow earlier release of hardware IDs (e.g., releasing virtual IDs as a background process while making the hardware IDs available for the next shader program), and facilitate preemption.

When a kick is preempted, token parser 315 may free the preempted hardware IDs and trigger a write of the associated virtual hardware IDs to a data structure in memory. Thus, virtual hardware ID handler circuitry 1025 is configured to save tracking information for virtualization on a context switch out and retrieve the tracking information on a context restore in order to correctly handle virtual pages managed by MMU 1010. On a restore, token parser 315 may assign new hardware IDs to the retrieved virtual hardware IDs and send the mapping to MMU 1010. In some embodiments, most of the tracking information may be saved and restored at page table cache instances in MMU 1010. The tracking information may also include the associated kernel ID and virtual tile ID, for example.

In various embodiments, flushing and invalidating cache lines used to back GPRs, along with storing various associated information such as page catalog base address information and virtualization information may facilitate efficient context switches in a unified memory architecture.

Overview of Channel Deactivation Based on Instruction Cache Misses

Another source of varied stall time for a thread may be instruction cache misses. A given architecture may include multiple hierarchical instruction cache and misses at one or more levels may substantially increase latency. Therefore, channels may be deactivated when they miss at one or more instruction cache levels, in some embodiments. It may be desirable, however, to guarantee forward progress (e.g., to ensure that a thread is not deactivated continuously because other work repeatedly causes eviction of that thread's instructions while it is deactivated). Therefore, in some embodiments, some cache operations may enforce a stall on an instruction cache miss rather than allowing deactivation of a corresponding thread.

Figure 11:
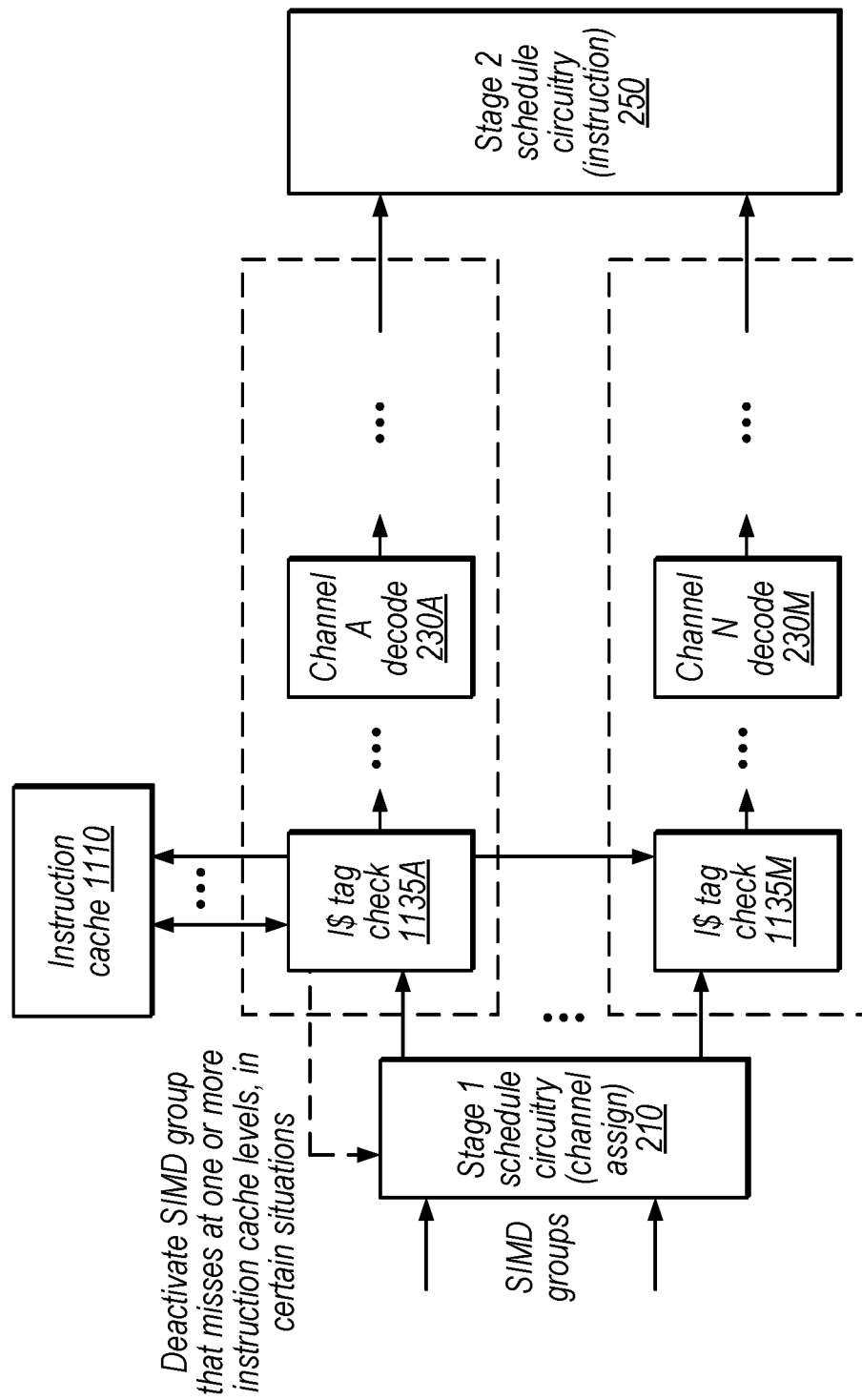
FIG. 11 is a block diagram illustrating an example pipeline configured to deactivate a channel based on an instruction cache miss, according to some embodiments.

FIG. 11 is a block diagram illustrating an example pipeline configured to deactivate a channel based on an instruction cache miss, according to some embodiments. In the illustrated embodiment, the pipeline includes stage 1 schedule circuitry 210, multiple channels pipelines (that includes respective instruction cache tag check circuitry 1135 and decode circuitry 230), instruction cache 1110, and stage 2 schedule circuitry 250.

Decode stages 230, and schedule circuitry 210 and 250 may operate as described above with reference to FIG. 2.

Instruction cache 1110, in some embodiments, corresponds to one or both of IL0 cache 375 and IL1 cache 376. A given instruction cache tag check stage 1135 is configured to check whether requested data is present in the instruction cache. If not, this stage may deactivate a SIMD group/channel that misses at one or more instruction cache levels, in certain situations. For example, the channel may generally deactivate but may eventually proceed with an instruction cache request that requires a return (that indicates the SIMD group should not be deactivated) to provide forward progress. A detailed state diagram for handling different types of instruction cache requests is discussed below with reference to FIG. 13.

Figure 12:
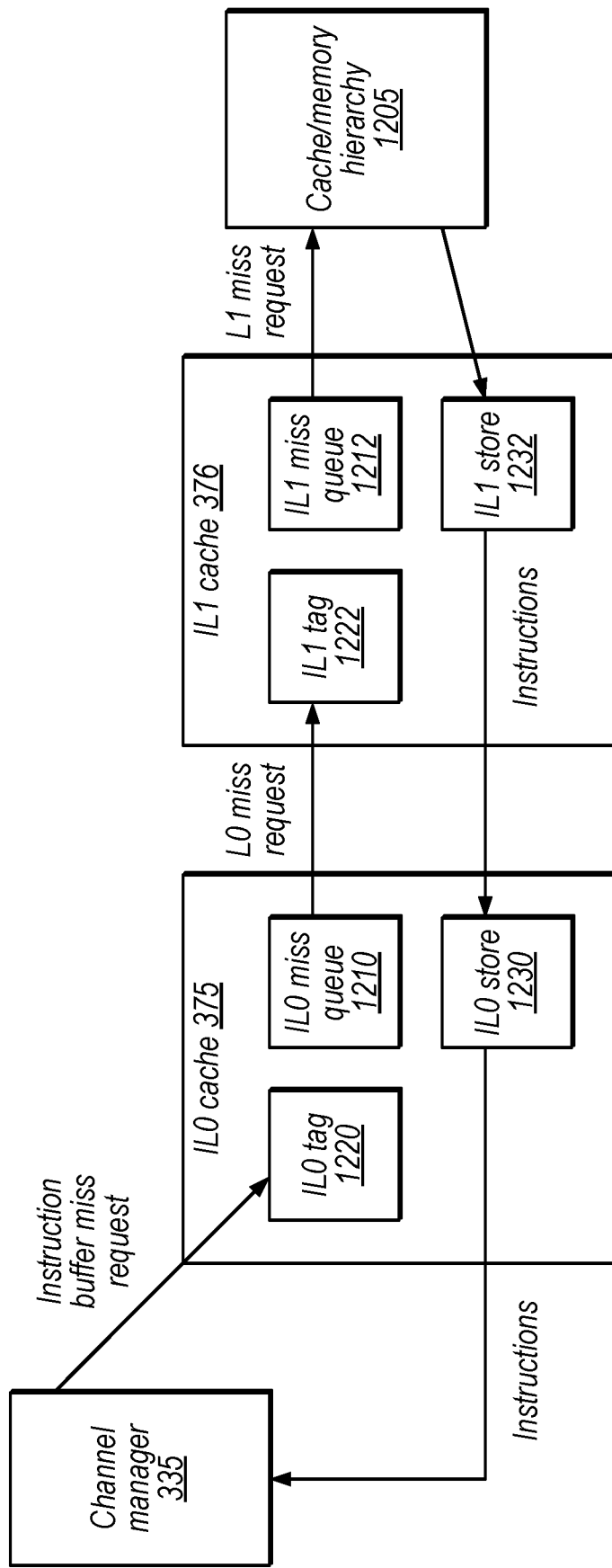
FIG. 12 is a block diagram illustrating an example two-level instruction cache implementation, according to some embodiments.

FIG. 12 is a block diagram illustrating an example two-level instruction cache implementation, according to some embodiments. Although two levels are shown for purposes of illustration, disclosed channel deactivation techniques may be utilized with additional cache levels or a single cache level, in other embodiments.

In the illustrated embodiment, the processor includes channel manager 335, IL0 cache 375, and IL1 cache 376 (which may generally operate as discussed above with reference to FIG. 4) and cache/memory hierarchy 1205.

Channel manager 335, in the illustrated embodiment, issues an instruction buffer miss request when instructions for a channel miss in an instruction buffer (not shown). IL0 cache 375 checks IL0 tags 1220 based on the request. For a miss, the request enters IL0 miss queue 1210 then issues to IL1 cache 376. IL1 cache 376 in turn checks IL1 tags 1222 and the request enters the IL1 miss queue 1212 on a miss. The request proceeds as an L1 miss request to cache/memory hierarchy 1205. When the data eventually returns, it propagates via IL1 cache storage 1232, IL0 cache storage 1230, and back to channel manager 335 for execution.

In some embodiments, when a request misses in IL1 cache 376, control circuitry deactivates the corresponding channel. The control circuitry may signal that the channel is ready for arbitration when the cache fill data arrives in IL1 cache 376 from cache/memory hierarchy 1205. Once the SIMD group is re-activated, it may request the instruction data, which may then be fetched into IL0 and the instruction buffer.

As discussed above a thread may be deactivated because of an instruction cache miss, be reactivated, but be deactivated again because another thread caused eviction of its desired instruction data in the interim. Therefore, in some embodiments, cache control circuitry supports two types of instruction cache requests, a request "without return" (which allows thread deactivation for instruction cache misses) and a request "with return" (which does not cause deactivation on a miss in IL0 and IL1, but rather will wait until data is available in IL0."

Figure 13:
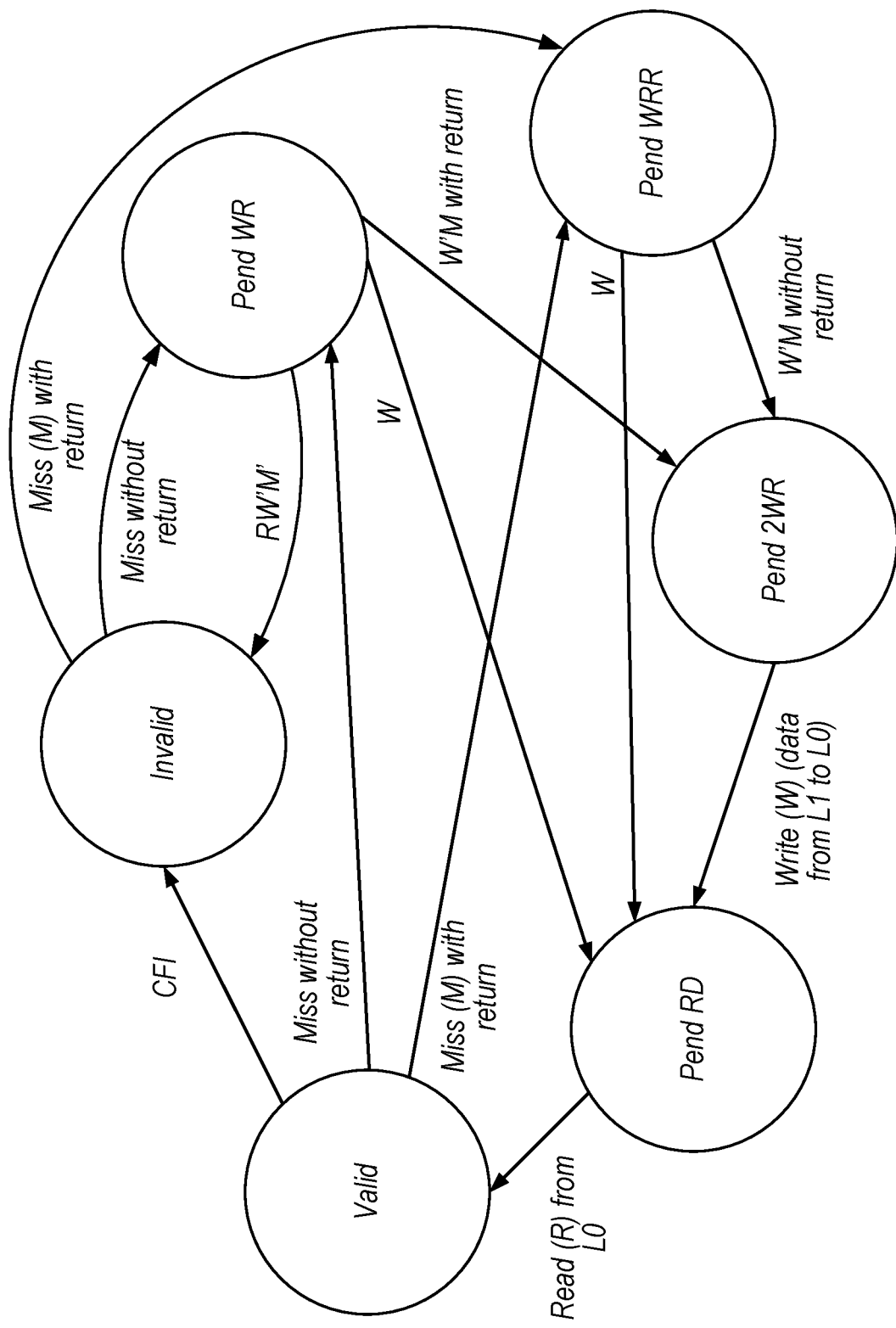
FIG. 13 illustrates an example state diagram for instruction cache control, according to some embodiments.

FIG. 13 illustrates an example state diagram for instruction cache control, according to some embodiments. As shown, transitions are different in certain cases for misses with return and without return. In the illustrated example, "M" represents a miss, "R" represents a read of data from IL0, and "W" represents a write from IL1 to IL0.

As shown, starting from INVALID, a miss without return will transition to PEND_WR while a miss with return will transition to PEND_WRR while the instruction is being fetched. Note that a "w_rtn" field may indicate whether a request is with or without return. If a second miss with a different w_rtn occurs, the state changes to PEND_2WR. Because a miss without return might not return instructions, a read with no write changes the state back to INVALID. If instructions are returned, a write changes the state to PEND_RD. Once in the PEND_RD state, the read changes the state to VALID. From the VALID state, a miss replacement will move the state to PEND_WR or PEND_WRR as before based on w_rtn, and a cache flush invalidate (CFI) changes the state to INVALID.

Example Methods

Figure 14:
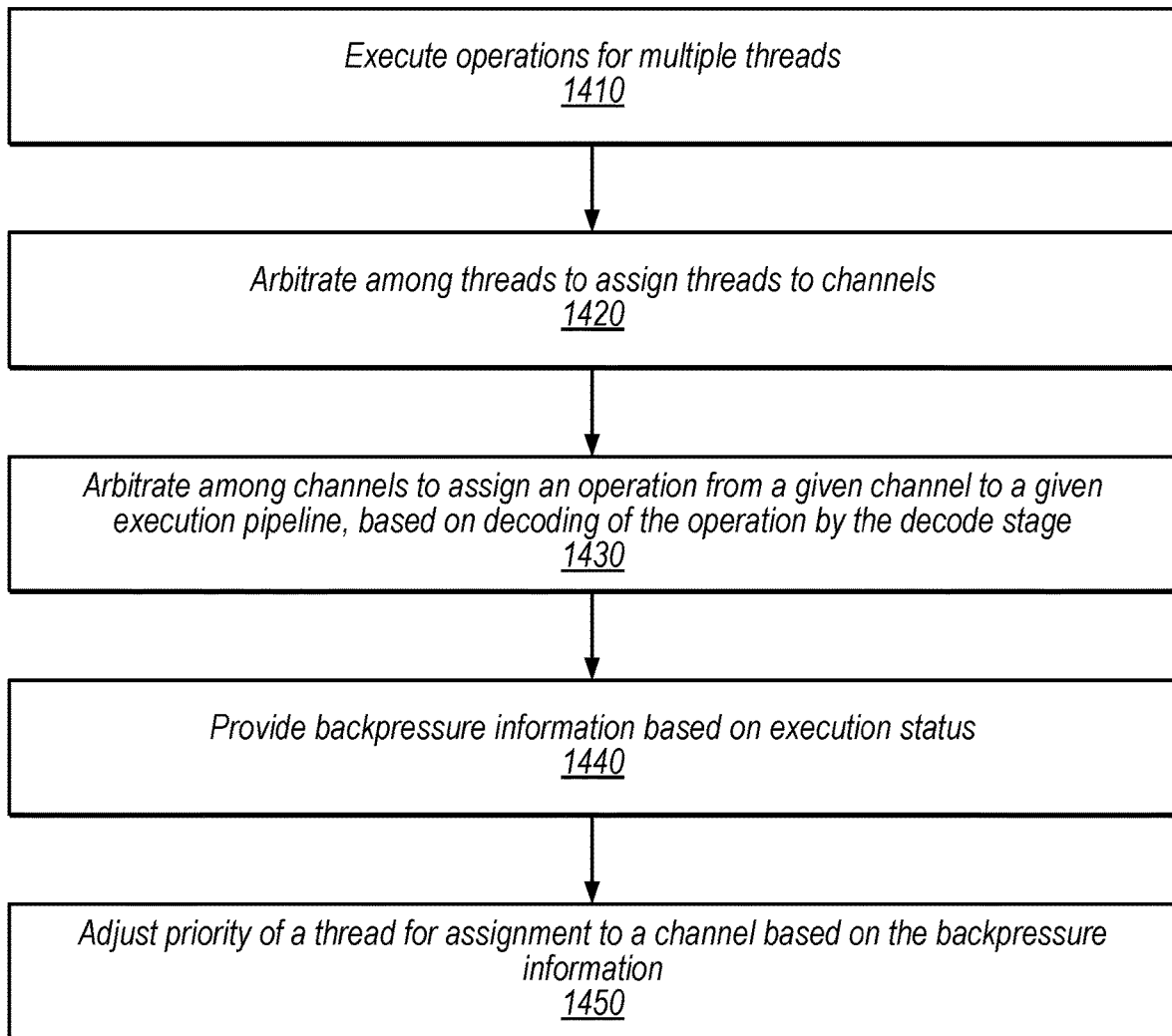
FIGS. 14-17 are flow diagrams illustrating example methods, according to some embodiments.

FIG. 14 is a flow diagram illustrating an example method for scheduling threads based on backpressure information, according to some embodiments. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1410, in the illustrated embodiment, a computing device executes operations for multiple threads. In some embodiments, the execution utilizes a plurality of channel pipelines for a plurality of channels, wherein the channel pipeline for a given channel includes a decode stage and a plurality of execution pipelines shared by the channel pipelines and configured to perform different types of operations provided by the channel pipelines.

In some embodiments, the threads are included in single-instruction multiple-data (SIMD) groups and scheduler circuitry is configured to assign SIMD groups to channels. In some embodiments, the plurality of execution pipelines include an integer pipeline, a floating-point pipeline, and a load pipeline.

At 1420, in the illustrated embodiment, the computing device (e.g., using stage 1 scheduler 210) arbitrates among threads to assign threads to channels.

At 1430, in the illustrated embodiment, the computing device (e.g., using stage 2 scheduler 250) arbitrates among channels to assign an operation from a given channel to a given execution pipeline, based on decoding of the operation by the decode stage. In some embodiments, the stage 2 scheduler 250 is configured to arbitrate based on channel priority, hardware resources requested by channels, and hardware resource availability information.

At 1440, in the illustrated embodiment, the computing device (e.g., using pipelines 260) provides backpressure information based on execution status.

At 1450, in the illustrated embodiment, the computing device adjusts priority of a thread for assignment to a channel based on the backpressure information.

In some embodiments, the priority adjustment based on compiler hint information that indicates a type of execution pipeline targeted by a thread. For example, scheduler circuitry may increase the priority of a thread that targets an execution pipeline whose backpressure is below a threshold (or reduce the priority of a thread that targets a busy execution pipeline). In some embodiments, the stage 1 scheduler 210 implements age-based arbitration among channels and is configured to adjust an initial age-based priority of a thread based on the backpressure information.

In some embodiments, the stage 1 scheduler 210 is configured to, prior to completion of a first thread assigned to a first channel, perform a commandeer procedure to remove the first thread from the first channel and assign a second thread to the first channel, where the second thread has a higher priority than the first thread. In some embodiments, dependency circuitry is configured to, for a first operation that depends on a prior operation that uses one of the execution pipelines, determine, based on status information for the prior operation from the one of the execution pipelines, whether to stall the first operation or to deactivate a thread that includes the first operation from its assigned channel.

Figure 15:
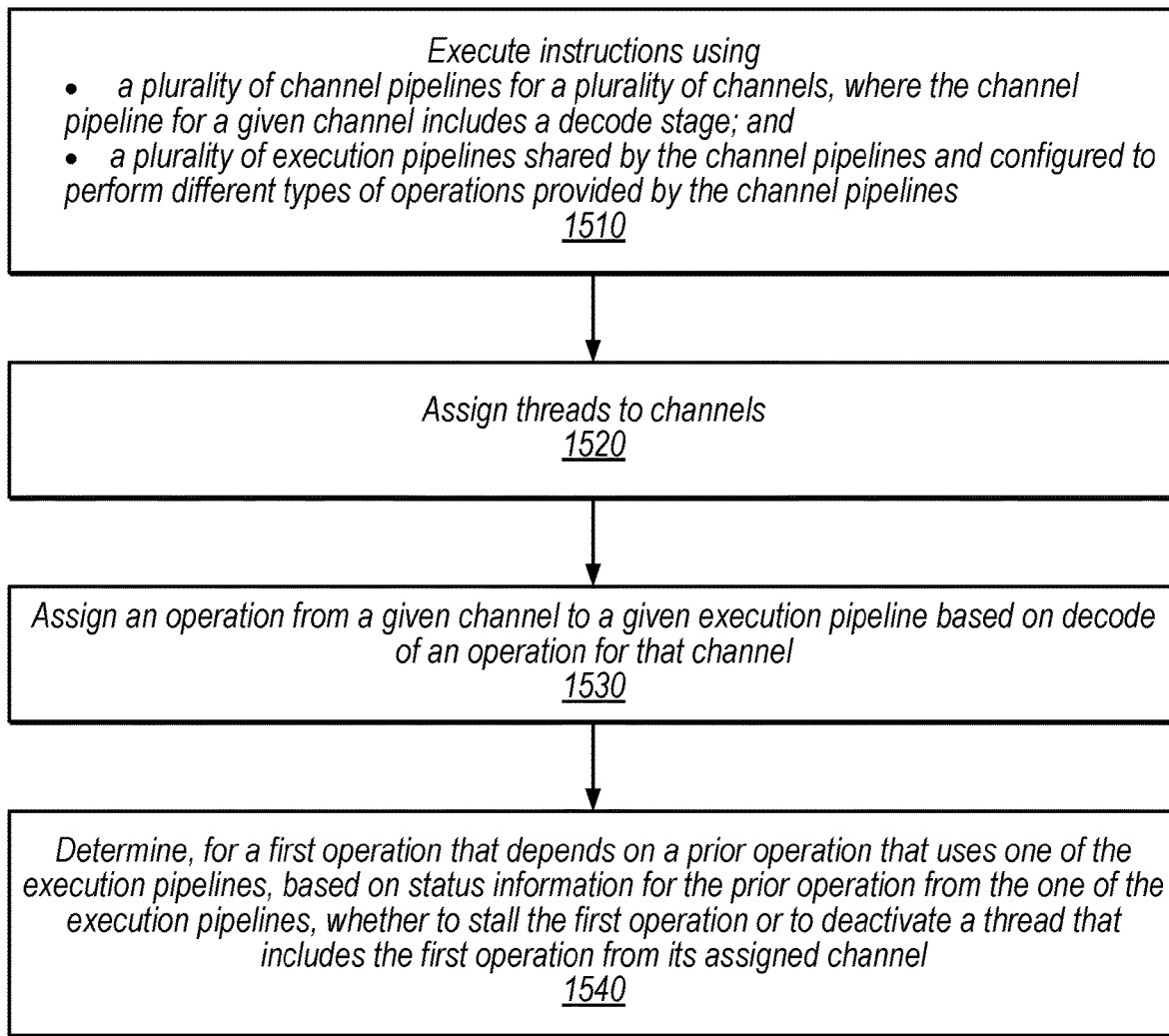

FIG. 15 is a flow diagram illustrating an example method for dependency management, according to some embodiments. The method shown in FIG. 15 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1510, in the illustrated embodiment, a computing device executes instructions using a plurality of channel pipelines for a plurality of channels, where the channel pipeline for a given channel includes a decode stage and a plurality of execution pipelines shared by the channel pipelines and configured to perform different types of operations provided by the channel pipelines.

At 1520, in the illustrated embodiment, the computing device (e.g., using stage 1 scheduler 210) assigns threads to channels.

At 1530, in the illustrated embodiment, the computing device (e.g., using stage 2 scheduler 250) assigns an operation from a given channel to a given execution pipeline based on decode of an operation for that channel.

At 1540, in the illustrated embodiment, the computing device (e.g., using fence manager 355) determines, for a first operation that depends on a prior operation that uses one of the execution pipelines, based on status information for the prior operation from the one of the execution pipelines, whether to stall the first operation or to deactivate a thread that includes the first operation from its assigned channel.

In some embodiments, the plurality of execution pipelines are configured to operate on input operands stored in memory-backed registers, wherein the status information includes information regarding a data cache access for a miss for a memory-backed register. In some embodiments, dependency circuitry stalls the first operation in response to all input operands for the prior operation being available in a register or a hit in a first level data cache. In some embodiments, dependency circuitry deactivates the thread that includes the first operation in response to a miss for the prior operation in the first level data cache.

In some embodiments, the status information indicates a current pipeline stage of the prior operation. In some embodiments, the dependency circuitry is configured to resume the first operation (e.g., if stalled rather than deactivated) in response to one or more conditions associated with the prior operation.

In some embodiments, dependency circuitry detects the dependency of the first operation on the prior operation based on a compiler-inserted fence and the dependency circuitry includes a set of active fence counters. In some embodiments, dependency circuitry includes circuitry that tracks whether a given fence counter represents a number of decrements expected due to cache hits.

In some embodiments, the first scheduler circuitry is configured to consider deactivated threads for re-assignment to a channel and is configured to adjust priority of threads based on compiler hints indicating a targeted execution pipeline and status information for the targeted execution pipeline.

Figure 16:
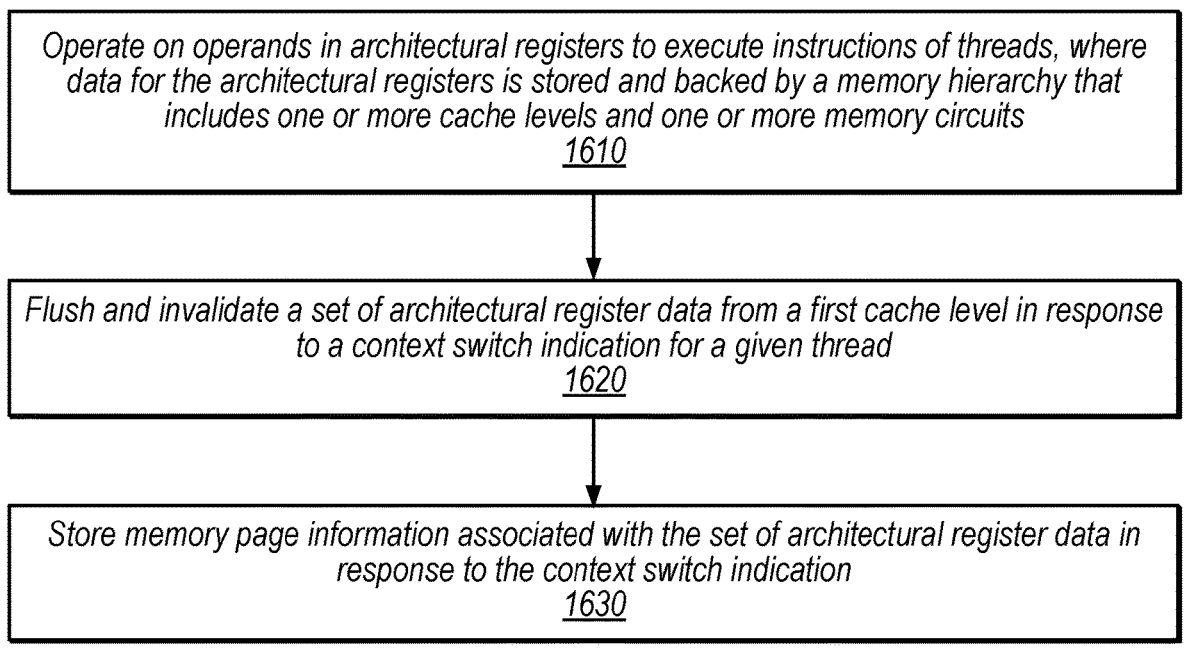

FIG. 16 is a flow diagram illustrating an example method for preemption in the context of memory-backed registers, according to some embodiments. The method shown in FIG. 16 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1610, in the illustrated embodiment, a computing device operates on operands in architectural registers to execute instructions of threads, where data for the architectural registers is stored and backed by a memory hierarchy that includes one or more cache levels and one or more memory circuits.

At 1620, in the illustrated embodiment, the computing device flushes and invalidates a set of architectural register data from a first cache level in response to a context switch indication for a given thread.

At 1630, in the illustrated embodiment, the computing device stores memory page information associated with the set of architectural register data in response to the context switch indication. In some embodiments, the memory page information includes a page catalog base address.

In some embodiments, memory allocator circuitry allocates one or more pages for the set of architectural register data and restores the one or more pages based on the stored memory page information in response to restoration of the thread. In some embodiments, memory management circuitry retrieves and caches one or more pages based on the stored memory page information.

In some embodiments, the set of architectural register data is stored in a private memory space for the thread that is addressed at least in part based on hardware identifier information. In some embodiments, control circuitry stores virtual hardware identifier information for the thread in response to the context switch indication and restores the virtual hardware identifier information for the thread in response to restoration of the thread.

In some embodiments, an operand cache (e.g., cache 348 of FIG. 3) stores operand data at a level that is nearer the execution circuitry in the memory hierarchy than the first cache level.

Figure 17:
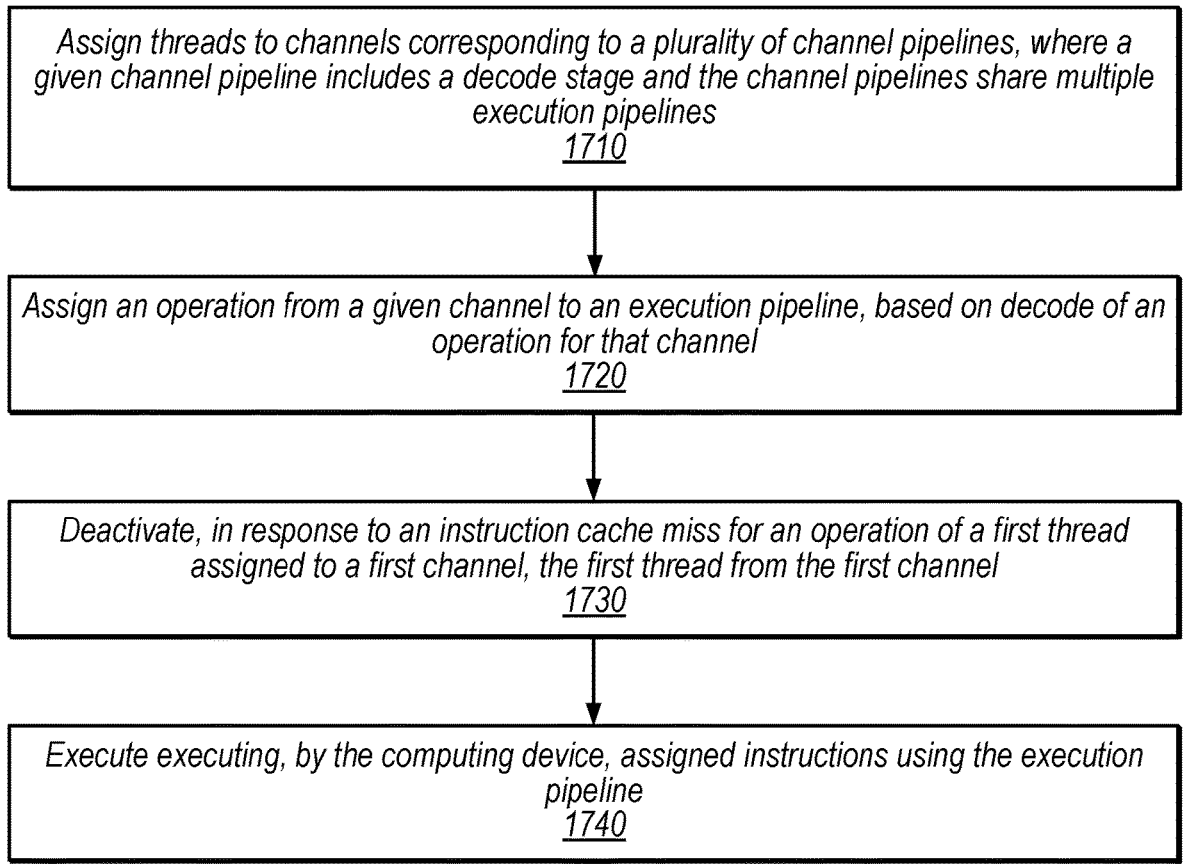

FIG. 17 is a flow diagram illustrating an example method for deactivating threads from channels based on instruction cache misses, according to some embodiments. The method shown in FIG. 17 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1710, in the illustrated embodiment, a computing device (e.g., using stage 1 scheduler 210) assigns threads to channels corresponding to a plurality of channel pipelines, wherein a given channel pipeline includes a decode stage and the channel pipelines share multiple execution pipelines.

At 1720, in the illustrated embodiment, the computing device (e.g., using stage 2 scheduler 250) assigns an operation from a given channel to an execution pipeline, based on decode of an operation for that channel.

At 1730, in the illustrated embodiment, the computing device (e.g., using thread replacement control circuitry) deactivates, in response to an instruction cache miss for an operation of a first thread assigned to a first channel, the first thread from the first channel. The control circuitry may support a control field that indicates whether a given operation is droppable or non-droppable and, in response to detecting an instruction cache miss for a non-droppable operation of a given thread, the control circuitry may stall the thread in its assigned channel until corresponding instruction data is available (instead of deactivating the thread).

In some embodiments, the first scheduler circuitry is configured to promote an operation from the first thread to a non-droppable request in response to a threshold number of misses for one or more droppable requests of the first thread. In some embodiments, control circuitry notifies the first scheduler circuitry (e.g., using scheduler 210) in response to retrieval of instruction data for the first thread into the instruction cache.

In some embodiments, the instruction cache circuitry includes at least first and second hierarchical levels and the thread replacement circuitry is configured to deactivate the first thread from the first channel in response to misses in both the first and second levels. In some embodiments, control circuitry is configured to notify the first scheduler circuitry in response to retrieval of instruction data into the first level but the control circuitry is not configured to fetch the instruction data into the second level until requested by the first thread after reactivation of the first thread.

At 1740, in the illustrated embodiment, the computing device (e.g., using a pipeline 260) executes assigned instructions using the execution pipeline. This may include performing instructions of the first thread and then performing instructions of another thread after the first thread is deactivated.

In some embodiments, miss queue circuitry is configured to store information for instruction cache misses and cache control circuitry is configured to: send a single fetch request in response to multiple instruction cache misses to the same instruction cache entry and update multiple corresponding miss queue entries in response to completion of the single fetch request.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 18:
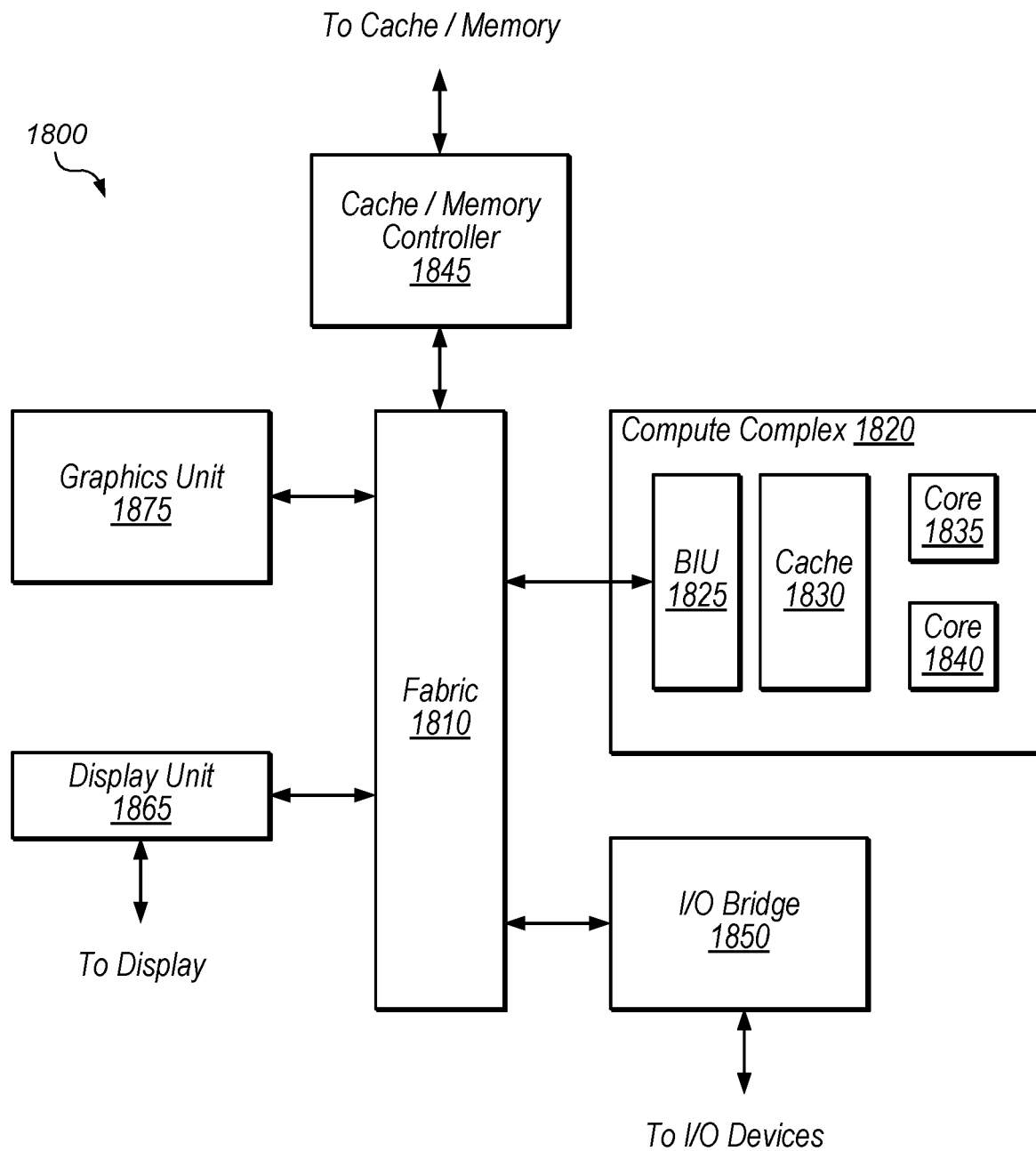
FIG. 18 is a block diagram illustrating an example computing device, according to some embodiments.

Referring now to FIG. 18, a block diagram illustrating an example embodiment of a device 1800 is shown. In some embodiments, elements of device 1800 may be included within a system on a chip. In some embodiments, device 1800 may be included in a mobile device, which may be battery-powered. Therefore, power consumption by device 1800 may be an important design consideration. In the illustrated embodiment, device 1800 includes fabric 1810, compute complex 1820 input/output (I/O) bridge 1850, cache/memory controller 1845, graphics unit 1875, and display unit 1865. In some embodiments, device 1800 may include other components (not shown) in addition to or in place of the illustrated components, such as video processor encoders and decoders, image processing or recognition elements, computer vision elements, etc.

Fabric 1810 may include various interconnects, buses, MUX's, controllers, etc., and may be configured to facilitate communication between various elements of device 1800. In some embodiments, portions of fabric 1810 may be configured to implement various different communication protocols. In other embodiments, fabric 1810 may implement a single communication protocol and elements coupled to fabric 1810 may convert from the single communication protocol to other communication protocols internally.

In the illustrated embodiment, compute complex 1820 includes bus interface unit (BIU) 1825, cache 1830, and cores 1835 and 1840. In various embodiments, compute complex 1820 may include various numbers of processors, processor cores and caches. For example, compute complex 1820 may include 1, 2, or 4 processor cores, or any other suitable number. In one embodiment, cache 1830 is a set associative L2 cache. In some embodiments, cores 1835 and 1840 may include internal instruction and data caches. In some embodiments, a coherency unit (not shown) in fabric 1810, cache 1830, or elsewhere in device 1800 may be configured to maintain coherency between various caches of device 1800. BIU 1825 may be configured to manage communication between compute complex 1820 and other elements of device 1800. Processor cores such as cores 1835 and 1840 may be configured to execute instructions of a particular instruction set architecture (ISA) which may include operating system instructions and user application instructions.

Note that while various GPU implementations have been discussed herein, various disclosed techniques such as multi-stage scheduling, compiler hints, fence management, memory-backed register handling for preemption, and handling instruction cache misses may be implemented in other types of processors such as compute complex 1820.

Cache/memory controller 1845 may be configured to manage transfer of data between fabric 1810 and one or more caches and memories. For example, cache/memory controller 1845 may be coupled to an L3 cache, which may in turn be coupled to a system memory. In other embodiments, cache/memory controller 1845 may be directly coupled to a memory. In some embodiments, cache/memory controller 1845 may include one or more internal caches.

As used herein, the term "coupled to" may indicate one or more connections between elements, and a coupling may include intervening elements. For example, in FIG. 18, graphics unit 1875 may be described as "coupled to" a memory through fabric 1810 and cache/memory controller 1845. In contrast, in the illustrated embodiment of FIG. 18, graphics unit 1875 is "directly coupled" to fabric 1810 because there are no intervening elements.

Graphics unit 1875 may include one or more processors, e.g., one or more graphics processing units (GPU's). Graphics unit 1875 may receive graphics-oriented instructions, such as OPENGL®, Metal, or DIRECT3D® instructions, for example. Graphics unit 1875 may execute specialized GPU instructions or perform other operations based on the received graphics-oriented instructions. Graphics unit 1875 may generally be configured to process large blocks of data in parallel and may build images in a frame buffer for output to a display, which may be included in the device or may be a separate device. Graphics unit 1875 may include transform, lighting, triangle, and rendering engines in one or more graphics processing pipelines. Graphics unit 1875 may output pixel information for display images. Graphics unit 1875, in various embodiments, may include programmable shader circuitry which may include highly parallel execution cores configured to execute graphics programs, which may include pixel tasks, vertex tasks, and compute tasks (which may or may not be graphics-related).

In various embodiments, disclosed techniques may improve performance, reduce power consumption, or both for operations performed by graphics unit 1875.

Display unit 1865 may be configured to read data from a frame buffer and provide a stream of pixel values for display. Display unit 1865 may be configured as a display pipeline in some embodiments. Additionally, display unit 1865 may be configured to blend multiple frames to produce an output frame. Further, display unit 1865 may include one or more interfaces (e.g., MIPI® or embedded display port (eDP)) for coupling to a user display (e.g., a touchscreen or an external display).

I/O bridge 1850 may include various elements configured to implement: universal serial bus (USB) communications, security, audio, and low-power always-on functionality, for example. I/O bridge 1850 may also include interfaces such as pulse-width modulation (PWM), general-purpose input/output (GPIO), serial peripheral interface (SPI), and inter-integrated circuit (I2C), for example. Various types of peripherals and devices may be coupled to device 1800 via I/O bridge 1850.

In some embodiments, device 1800 includes network interface circuitry (not explicitly shown), which may be connected to fabric 1810 or I/O bridge 1850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1800 with connectivity to various types of other devices and networks.

Example Applications

Figure 19:
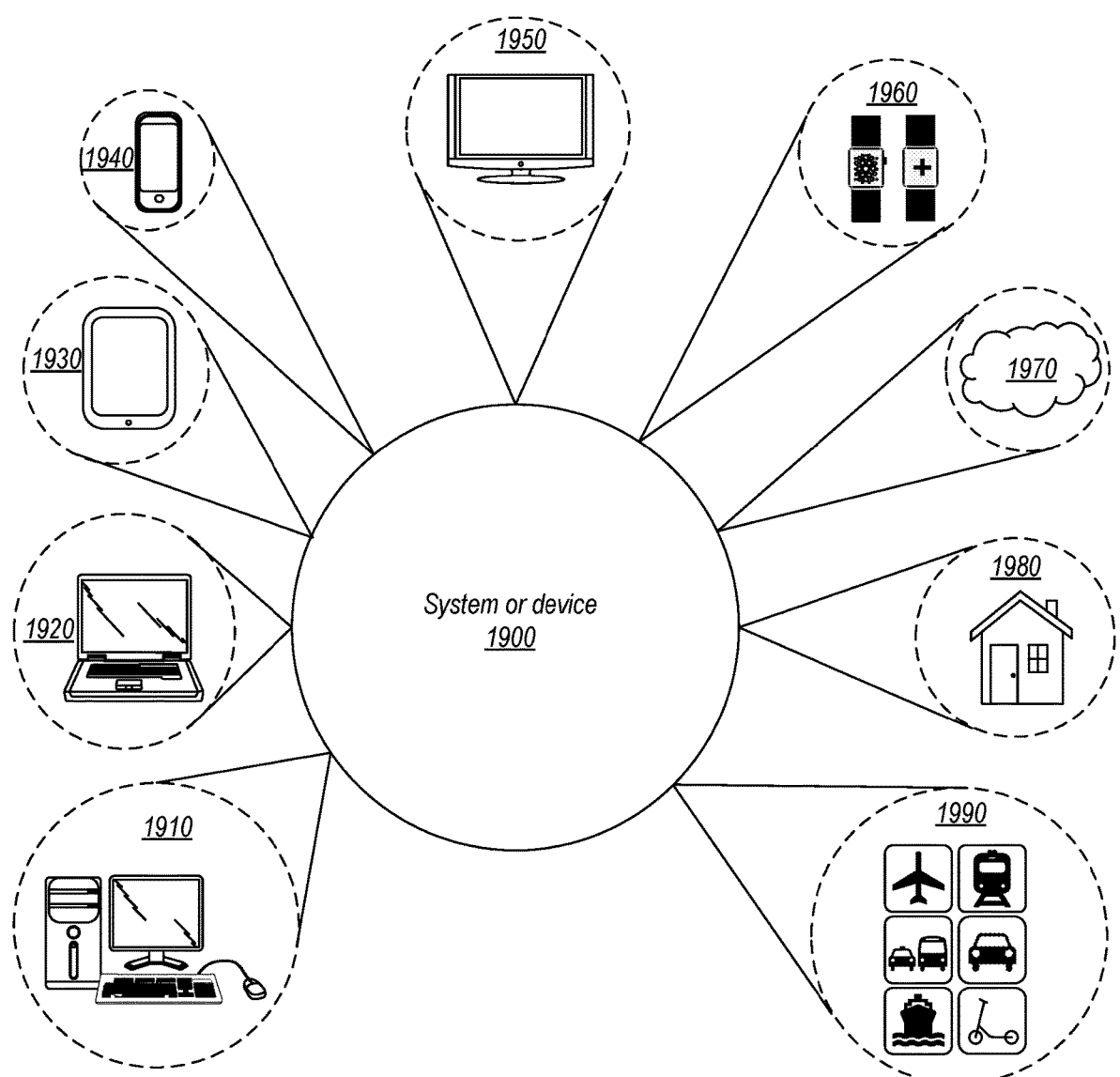
FIG. 19 is a diagram illustrating example applications of disclosed systems and devices, according to some embodiments.

Turning now to FIG. 19, various types of systems that may include any of the circuits, devices, or system discussed above. System or device 1900, which may incorporate or otherwise utilize one or more of the techniques described herein, may be utilized in a wide range of areas. For example, system or device 1900 may be utilized as part of the hardware of systems such as a desktop computer 1910, laptop computer 1920, tablet computer 1930, cellular or mobile phone 1940, or television 1950 (or set-top box coupled to a television).

Similarly, disclosed elements may be utilized in a wearable device 1960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1900 may also be used in various other contexts. For example, system or device 1900 may be utilized in the context of a server computer system, such as a dedicated server or on shared hardware that implements a cloud-based service 1970. Still further, system or device 1900 may be implemented in a wide range of specialized everyday devices, including devices 1980 commonly found in the home such as refrigerators, thermostats, security cameras, etc. The interconnection of such devices is often referred to as the "Internet of Things" (IoT). Elements may also be implemented in various modes of transportation. For example, system or device 1900 could be employed in the control systems, guidance systems, entertainment systems, etc. of various types of vehicles 1990.

The applications illustrated in FIG. 19 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 20:
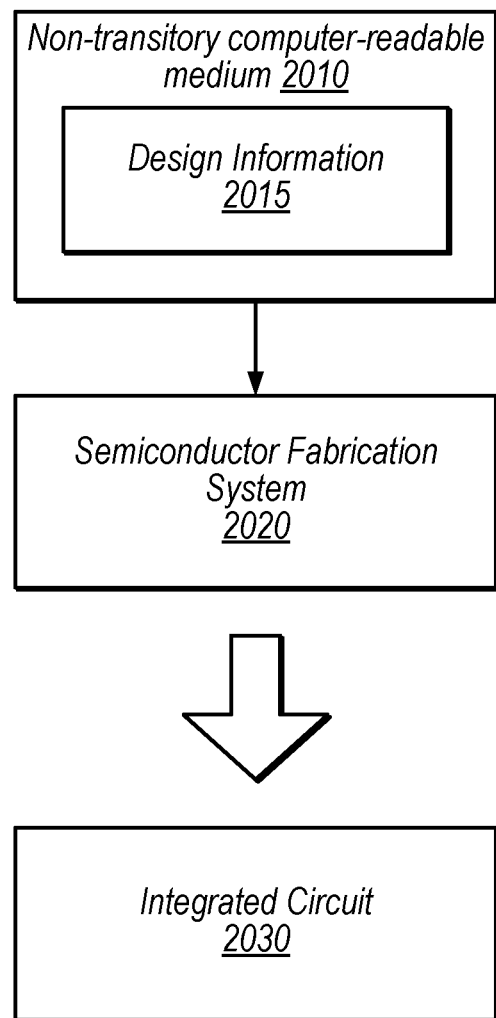
FIG. 20 is a block diagram illustrating an example computer-readable medium that stores circuit design information, according to some embodiments.

FIG. 20 is a block diagram illustrating an example non-transitory computer-readable storage medium that stores circuit design information, according to some embodiments. In the illustrated embodiment semiconductor fabrication system 2020 is configured to process the design information 2015 stored on non-transitory computer-readable medium 2010 and fabricate integrated circuit 2030 based on the design information 2015.

Non-transitory computer-readable storage medium 2010, may comprise any of various appropriate types of memory devices or storage devices. Non-transitory computer-readable storage medium 2010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 2010 may include other types of non-transitory memory as well or combinations thereof. Non-transitory computer-readable storage medium 2010 may include two or more memory mediums which may reside in different locations, e.g., in different computer systems that are connected over a network.

Design information 2015 may be specified using any of various appropriate computer languages, including hardware description languages such as, without limitation: VHDL, Verilog, SystemC, SystemVerilog, RHDL, M, MyHDL, etc. Design information 2015 may be usable by semiconductor fabrication system 2020 to fabricate at least a portion of integrated circuit 2030. The format of design information 2015 may be recognized by at least one semiconductor fabrication system 2020. In some embodiments, design information 2015 may also include one or more cell libraries which specify the synthesis, layout, or both of integrated circuit 2030. In some embodiments, the design information is specified in whole or in part in the form of a netlist that specifies cell library elements and their connectivity. Design information 2015, taken alone, may or may not include sufficient information for fabrication of a corresponding integrated circuit. For example, design information 2015 may specify the circuit elements to be fabricated but not their physical layout. In this case, design information 2015 may need to be combined with layout information to actually fabricate the specified circuitry.

Integrated circuit 2030 may, in various embodiments, include one or more custom macrocells, such as memories, analog or mixed-signal circuits, and the like. In such cases, design information 2015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 2020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2020 may also be configured to perform various testing of fabricated circuits for correct operation.

In various embodiments, integrated circuit 2030 is configured to operate according to a circuit design specified by design information 2015, which may include performing any of the functionality described herein. For example, integrated circuit 2030 may include any of various elements shown in FIGS. 1B, 2-6, 9-12, and 18. Further, integrated circuit 2030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    processor circuitry configured to execute operations for multiple threads, wherein the processor circuitry includes:
        a plurality of channel pipelines for a plurality of channels, wherein the channel pipeline for a given channel includes multiple pipeline stages, including a decode stage configured to identify one or more execution pipelines targeted by a given instruction;
        a plurality of execution pipelines shared by the channel pipelines and configured to perform different types of operations provided by the channel pipelines;
    first scheduler circuitry configured to arbitrate among threads, prior to the decode stages of the channel pipelines, to assign threads to channels based on priorities assigned to the threads; and
    second scheduler circuitry configured to arbitrate among channels to assign an operation from a given channel to a given execution pipeline, wherein the assignment is based on decode of the operation by the decode stage and wherein the arbitration is among a greater number of operations output by the channel pipelines than a number of available execution pipelines configured to perform the operations;
    wherein one or more of the plurality of execution pipelines are configured to provide backpressure information to the first scheduler circuitry based on execution status; and
    wherein the first scheduler circuitry is configured to adjust priority of an incoming thread for arbitration of the incoming thread by the first scheduler circuitry for assignment to a channel based on the backpressure information.

2. The apparatus of claim 1, wherein the first scheduler circuitry is configured to adjust the priority of a thread based on compiler hint information that indicates a type of execution pipeline targeted by a thread.

3. The apparatus of claim 2, wherein the first scheduler circuitry is configured to increase the priority of a thread that targets an execution pipeline whose backpressure is below a threshold.

4. The apparatus of claim 1, wherein the threads are included in single-instruction multiple-data (SIMD) groups and the first scheduler circuitry is configured to assign SIMD groups to channels.

5. The apparatus of claim 1, wherein the first scheduler circuitry is configured to, prior to completion of a first thread assigned to a first channel, perform a commandeer procedure to remove the first thread from the first channel and assign a second thread to the first channel, wherein the second thread has a higher priority than the first thread.

6. The apparatus of claim 1, wherein the first scheduler circuitry implements age-based arbitration among threads and is configured to adjust an initial age-based priority of a thread based on the backpressure information.

7. The apparatus of claim 1, wherein the plurality of execution pipelines include an integer pipeline, a floating-point pipeline, and a load pipeline.

8. The apparatus of claim 1, wherein the second scheduler circuitry is configured to arbitrate based on channel priority, hardware resources requested by channels, and hardware resource availability information.

9. The apparatus of claim 1, wherein further comprising:
    dependency circuitry configured to, for a first operation that depends on a prior operation that uses one of the execution pipelines, determine, based on status information for the prior operation from the one of the execution pipelines, whether to stall the first operation or to deactivate a thread that includes the first operation from its assigned channel.

10. The apparatus of claim 1, further comprising:
    fixed-function circuitry configured to control the execution pipelines to perform operations for at least one of the following types of programs:
        graphics shader programs; and
        machine learning programs.

11. The apparatus of claim 1, wherein the apparatus is a computing device that further comprises:
    a display;
    a central processing unit; and
    a network interface.

12. A method, comprising:
executing, by a computing device, operations for multiple threads using:
- a plurality of channel pipelines for a plurality of channels, wherein the channel pipeline for a given channel includes multiple pipeline stages, including a decode stage that identifies one or more execution pipelines targeted by a given instruction; and
- a plurality of execution pipelines shared by the channel pipelines and configured to perform different types of operations provided by the channel pipelines;

arbitrating, by the computing device, among threads, prior to the decode stages of the channel pipelines, to assign threads to channels based on priorities assigned to the threads;

arbitrating, by the computing device, among channels to assign an operation from a given channel to a given execution pipeline, based on decoding of the operation by the decode stage, wherein the arbitrating is among a greater number of operations output by the channel pipelines than a number of available execution pipelines configured to perform the operations;

providing, by the computing device, backpressure information based on execution status; and adjusting, by the computing device, priority of an incoming thread for arbitration for assignment to a channel based on the backpressure information.

13. The method of claim 12, wherein the adjusting is further based on compiler hint information that indicates a type of execution pipeline targeted by a thread.

14. The method of claim 13, wherein the adjusting includes increasing the priority of a thread that targets an execution pipeline whose backpressure is below a threshold.

15. The method of claim 12, further comprising:
prior to completion of a first thread assigned to a first channel, performing a commandeer procedure to remove the first thread from the first channel and assign a second thread to the first channel, wherein the second thread has a higher priority than the first thread.

16. The method of claim 12, wherein the arbitrating among threads implements age-based arbitration among channels and the adjusting is an adjustment to an initial age-based priority of a thread.

17. The method of claim 12, wherein the arbitrating among channels is based on channel priority, hardware resources requested by channels, and hardware resource availability information.

18. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
processor circuitry configured to execute operations for multiple threads, wherein the processor circuitry includes:
- a plurality of channel pipelines for a plurality of channels, wherein the channel pipeline for a given channel includes multiple pipeline stages, including a decode stage configured to identify one or more execution pipelines targeted by a given instruction;
- a plurality of execution pipelines shared by the channel pipelines and configured to perform different types of operations provided by the channel pipelines;
first scheduler circuitry configured to arbitrate among threads, prior to the decode stages of the channel pipelines, to assign threads to channels based on priorities assigned to the threads; and
second scheduler circuitry configured to arbitrate among channels to assign an operation from a given channel to a given execution pipeline, wherein the assignment is based on decode of the operation by the decode stage and wherein the arbitration is among a greater number of operations output by the channel pipelines than a number of available execution pipelines configured to perform the operations;
wherein one or more of the plurality of execution pipelines are configured to provide backpressure information to the first scheduler circuitry based on execution status; and
wherein the first scheduler circuitry is configured to adjust priority of an incoming thread for arbitration of the incoming thread by the first scheduler circuitry for assignment to a channel based on the backpressure information.

19. The non-transitory computer readable storage medium of claim 18, wherein the first scheduler circuitry is configured to adjust the priority of a thread based on compiler hint information that indicates a type of execution pipeline targeted by a thread.

20. The non-transitory computer readable storage medium of claim 18, wherein the first scheduler circuitry is configured to, prior to completion of a first thread assigned to a first channel, perform a commandeer procedure to remove the first thread from the first channel and assign a second thread to the first channel, wherein the second thread has a higher priority than the first thread.

* * * * *